March 27, 1973  J. J. MORAN  3,723,066
REAGENT DISPENSING MEANS FOR CHEMICAL TESTING APPARATUS
Original Filed June 14, 1968  35 Sheets-Sheet 5
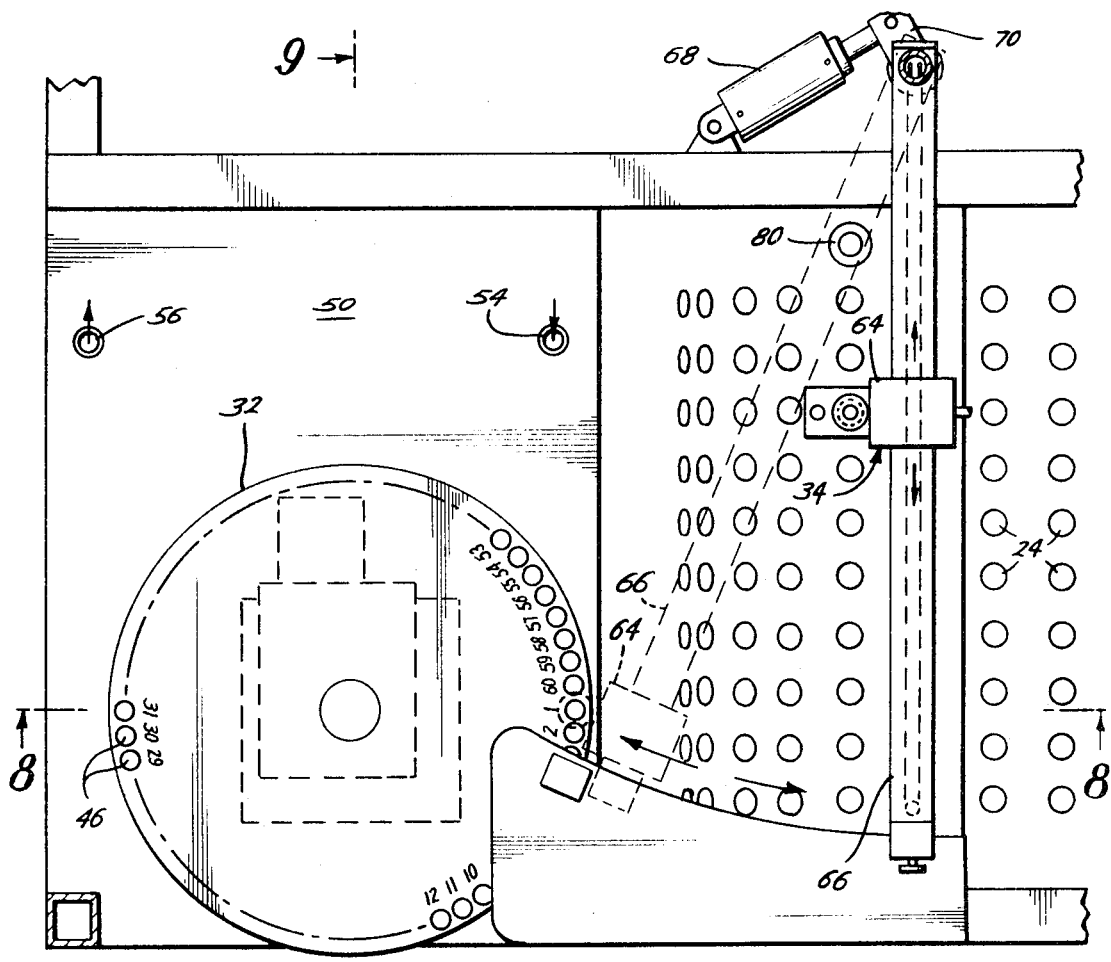
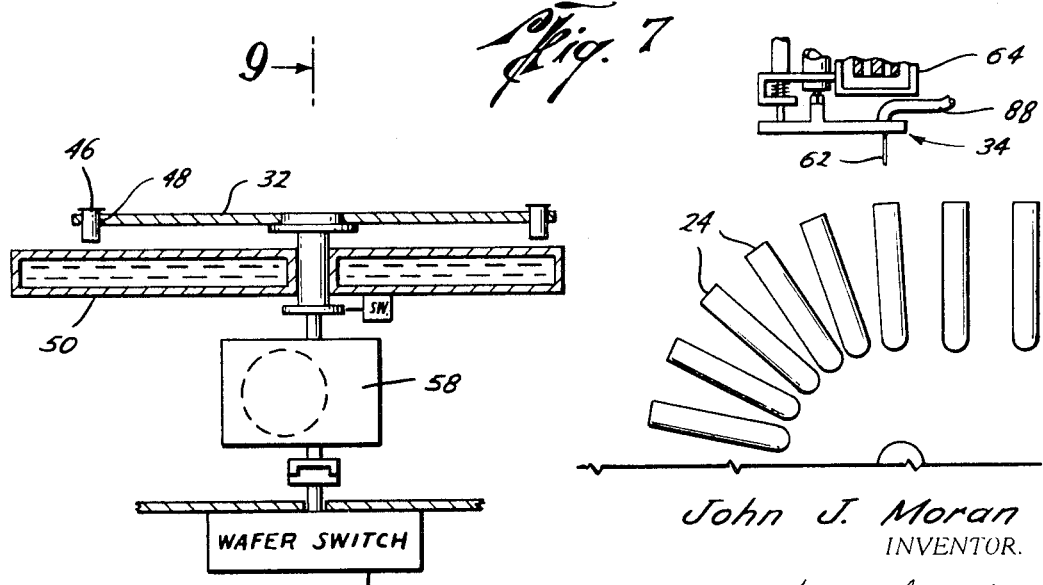
John J. Moran
INVENTOR.
ATTORNEYS March 27, 1973      J. J. MORAN      3,723,066
REAGENT DISPENSING MEANS FOR CHEMICAL TESTING APPARATUS
Original Filed June 14, 1968      35 Sheets-Sheet 6
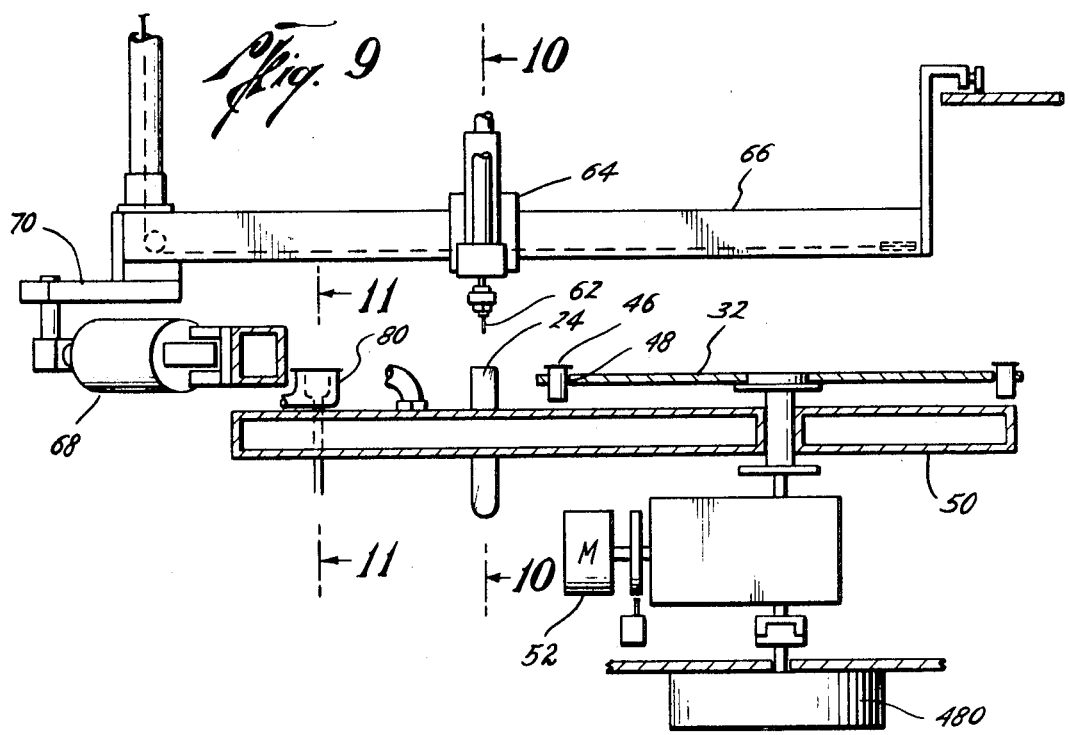
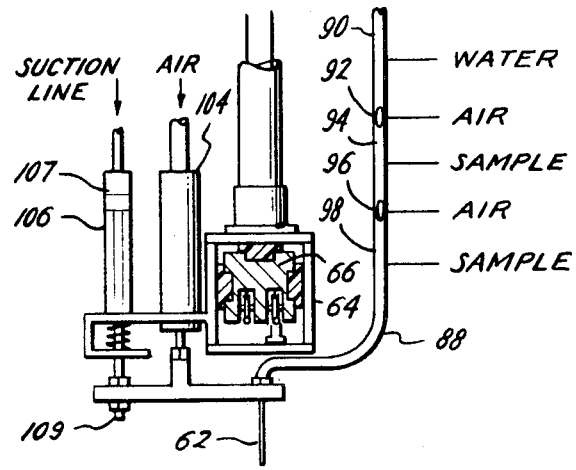
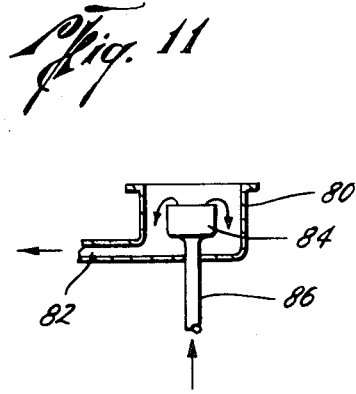
John J. Moran
INVENTOR.
BY
ATTORNEYS John J. Moran
INVENTOR.

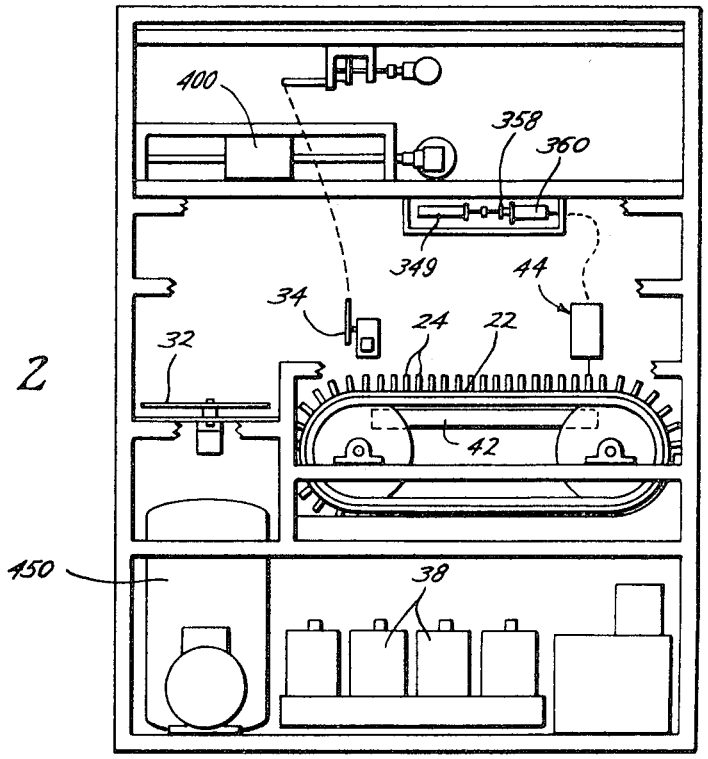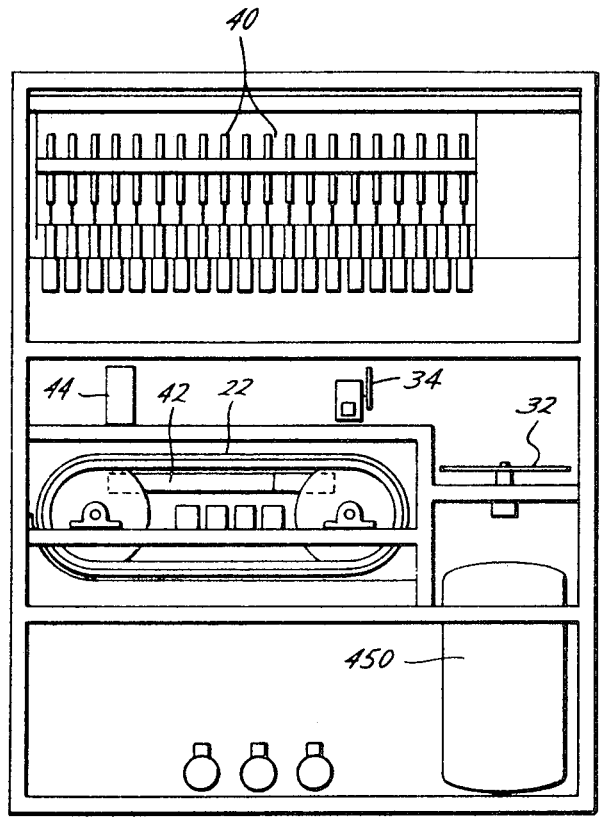

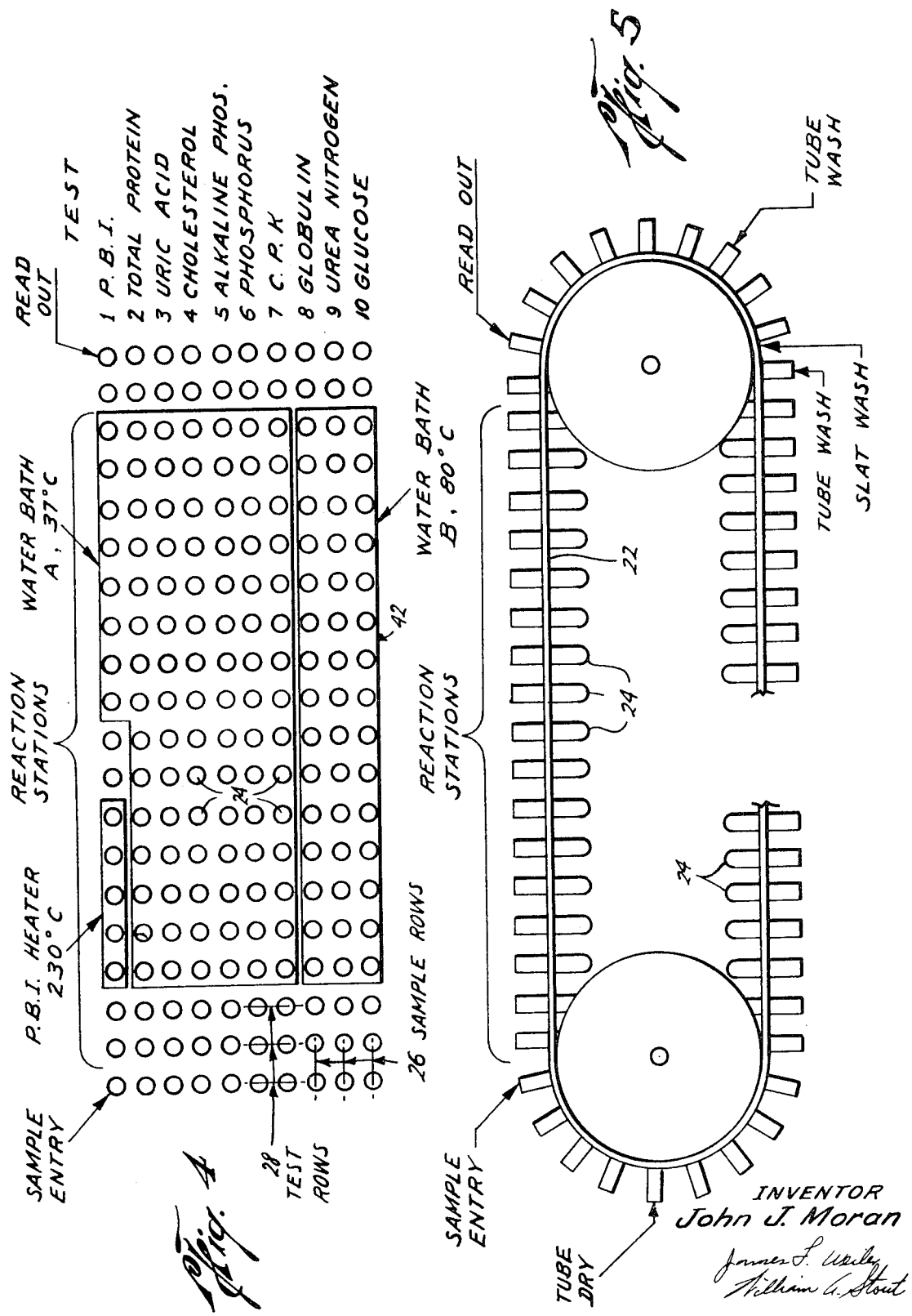

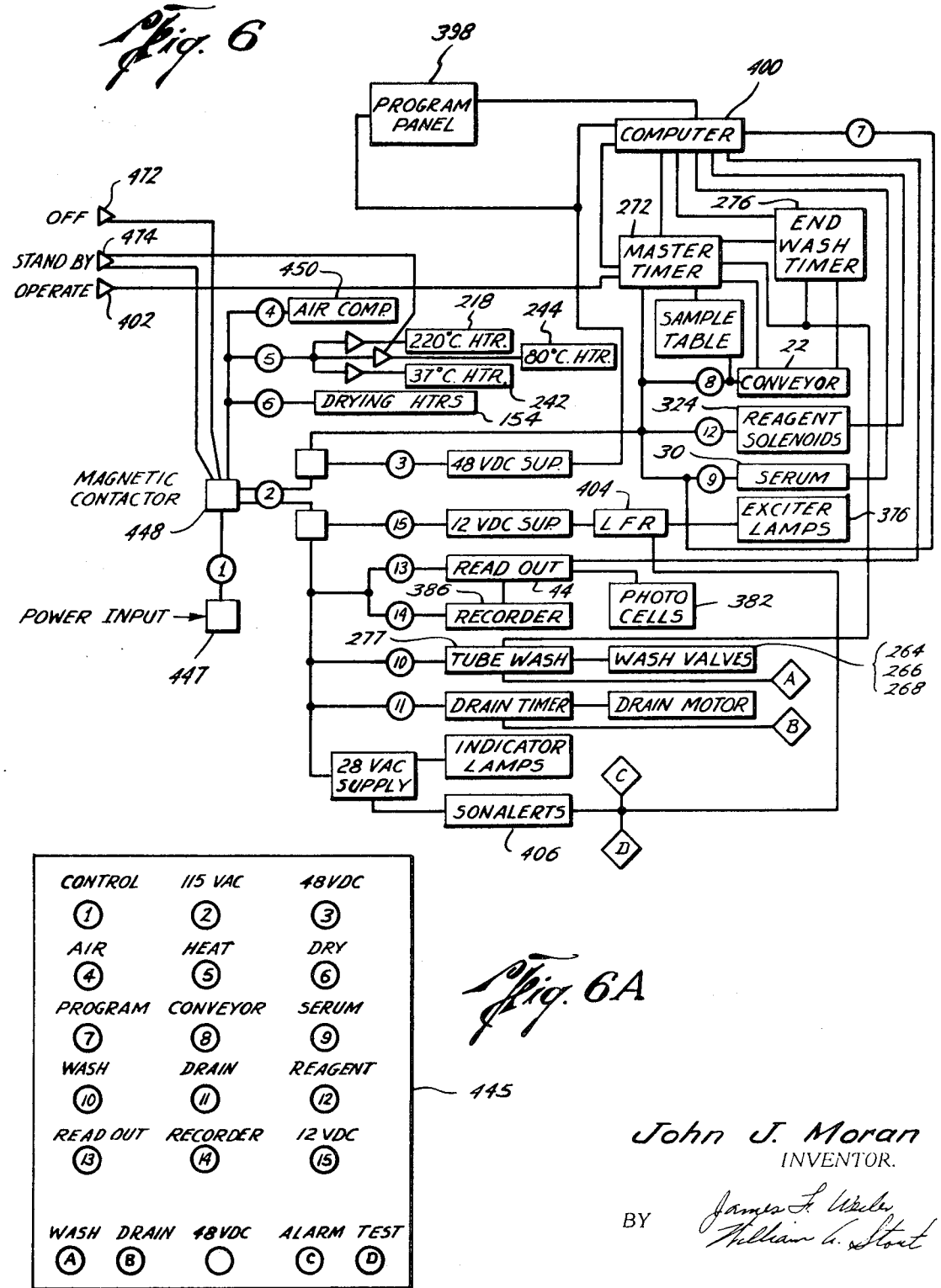

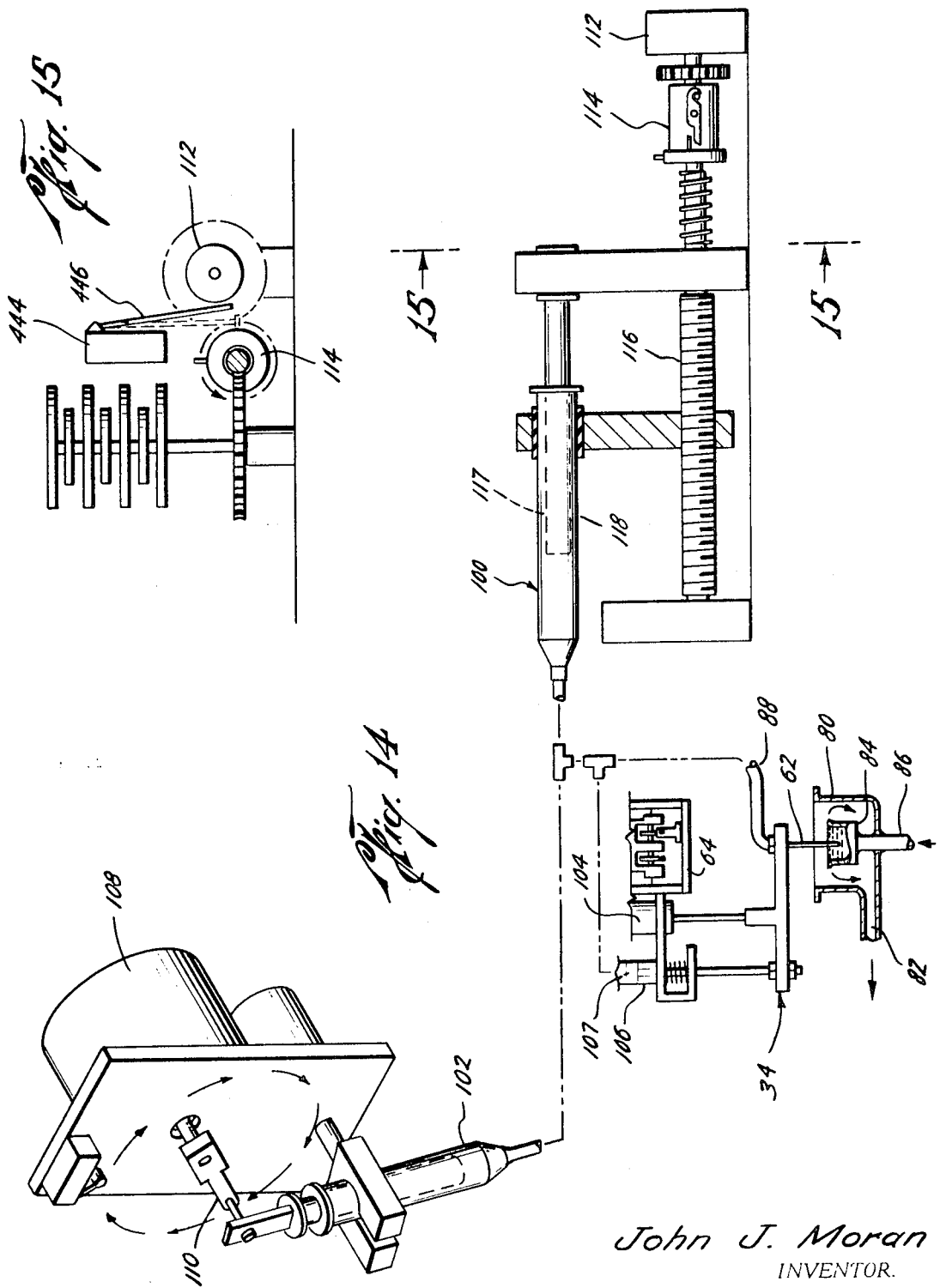

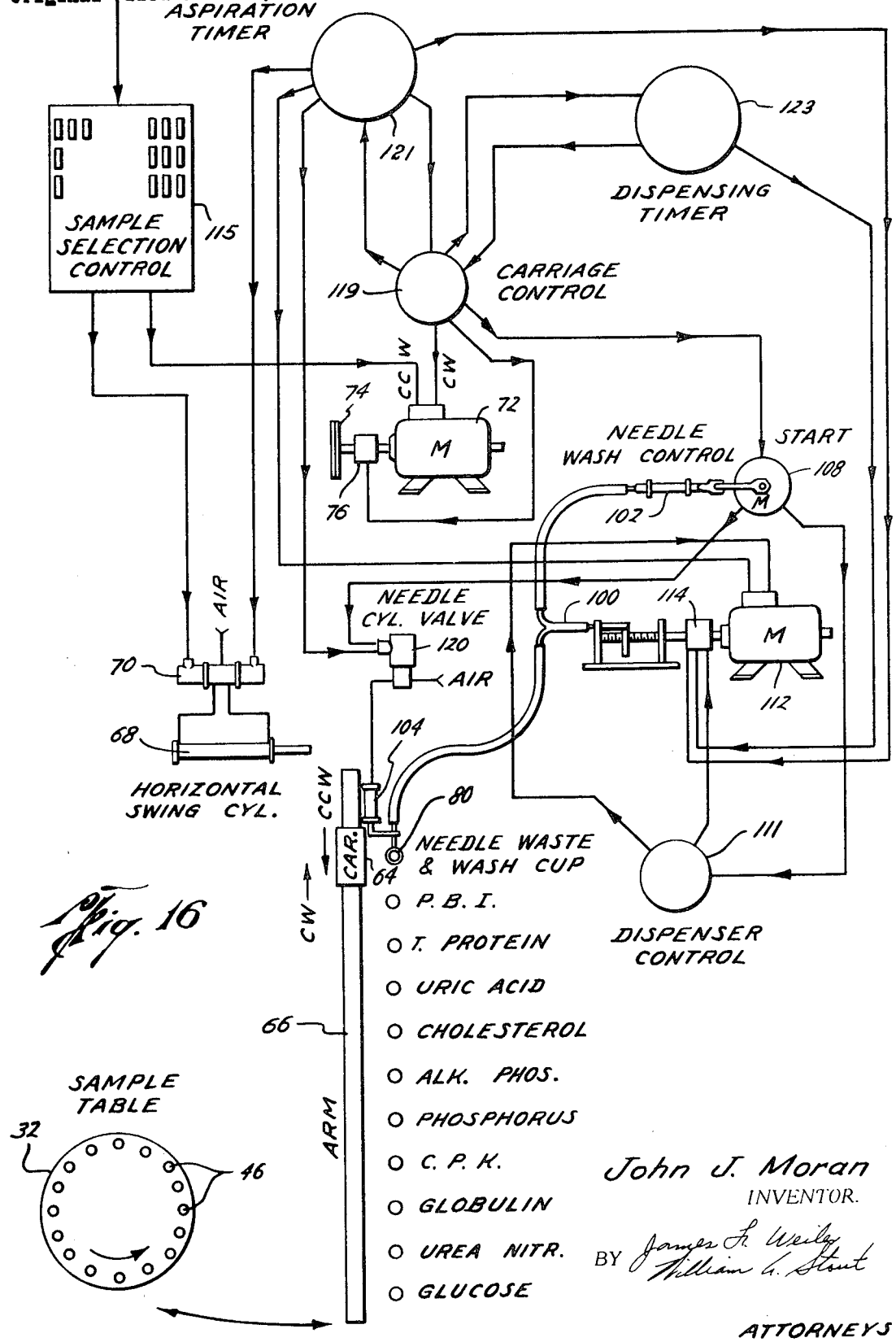

March 27, 1973 J. J. MORAN 3,723,066
REAGENT DISPENSING MEANS FOR CHEMICAL TESTING APPARATUS
Original Filed June 14, 1968 33 Sheets-Sheet 10

John J. Moran
INVENTOR.

BY James F. Wailes
William G. Stout

ATTORNEYS

March 27, 1973   J. J. MORAN   3,723,066
REAGENT DISPENSING MEANS FOR CHEMICAL TESTING APPARATUS
Original Filed June 14, 1968   33 Sheets-Sheet 11
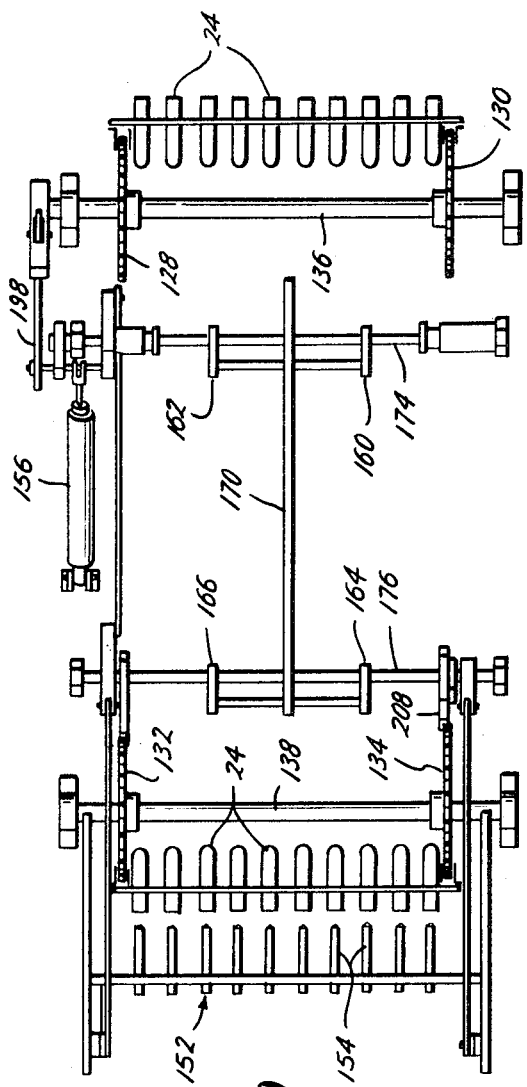
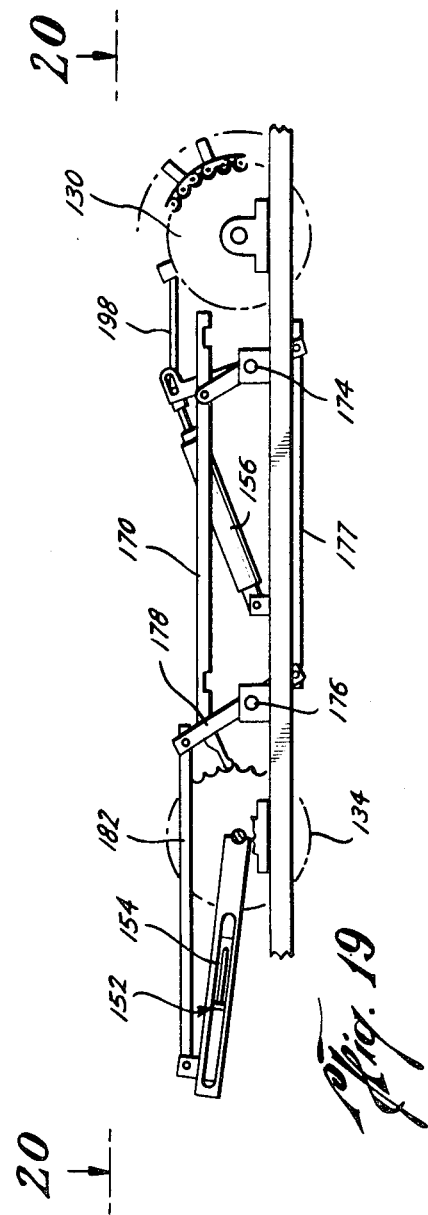
John J. Moran
INVENTOR.
BY James F. Weiler
William C. Stout
ATTORNEYS March 27, 1973  J. J. MORAN  3,723,066
REAGENT DISPENSING MEANS FOR CHEMICAL TESTING APPARATUS
Original Filed June 14, 1968  35 Sheets-Sheet 12

John J. Moran
INVENTOR.

BY
ATTORNEYS

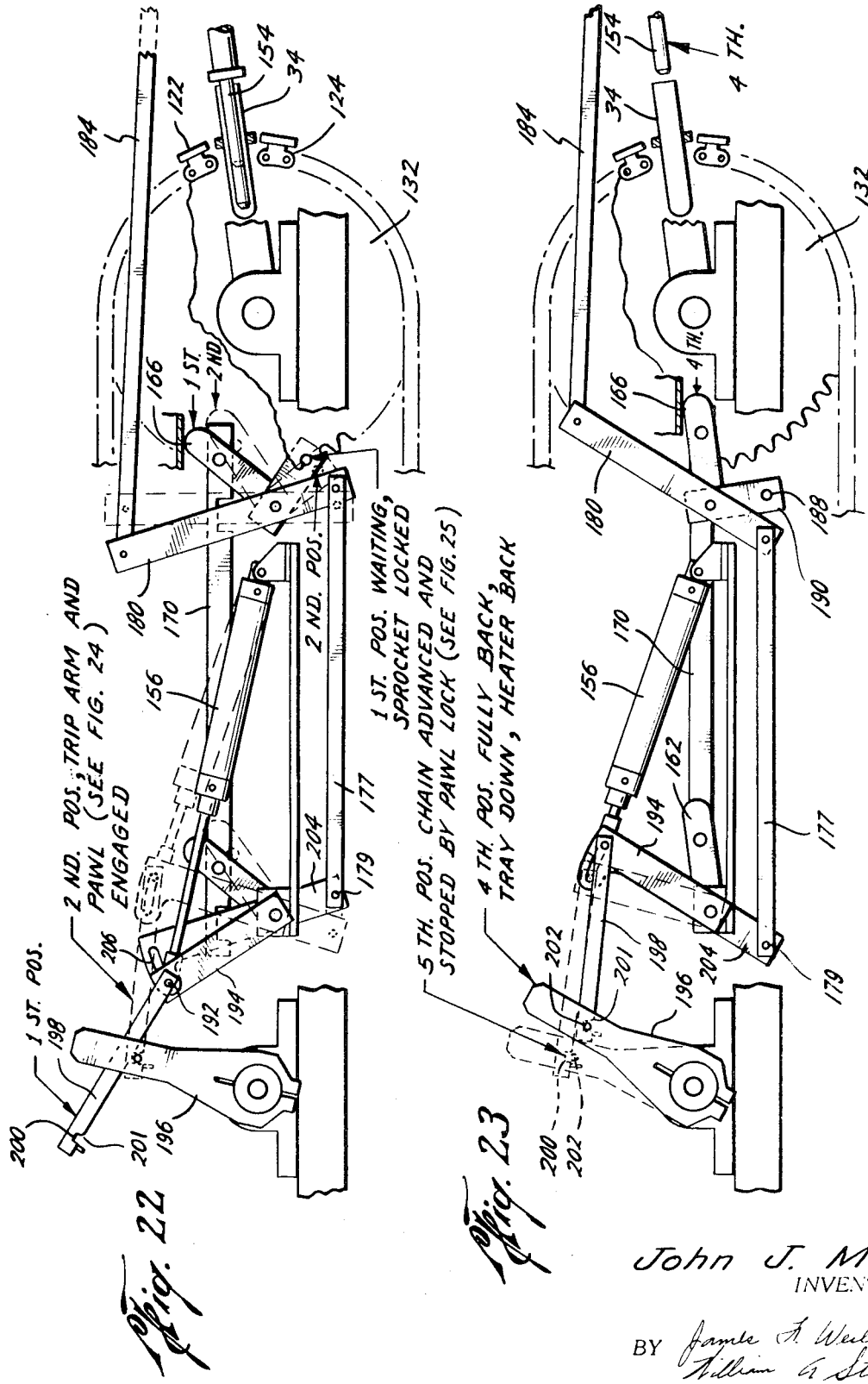

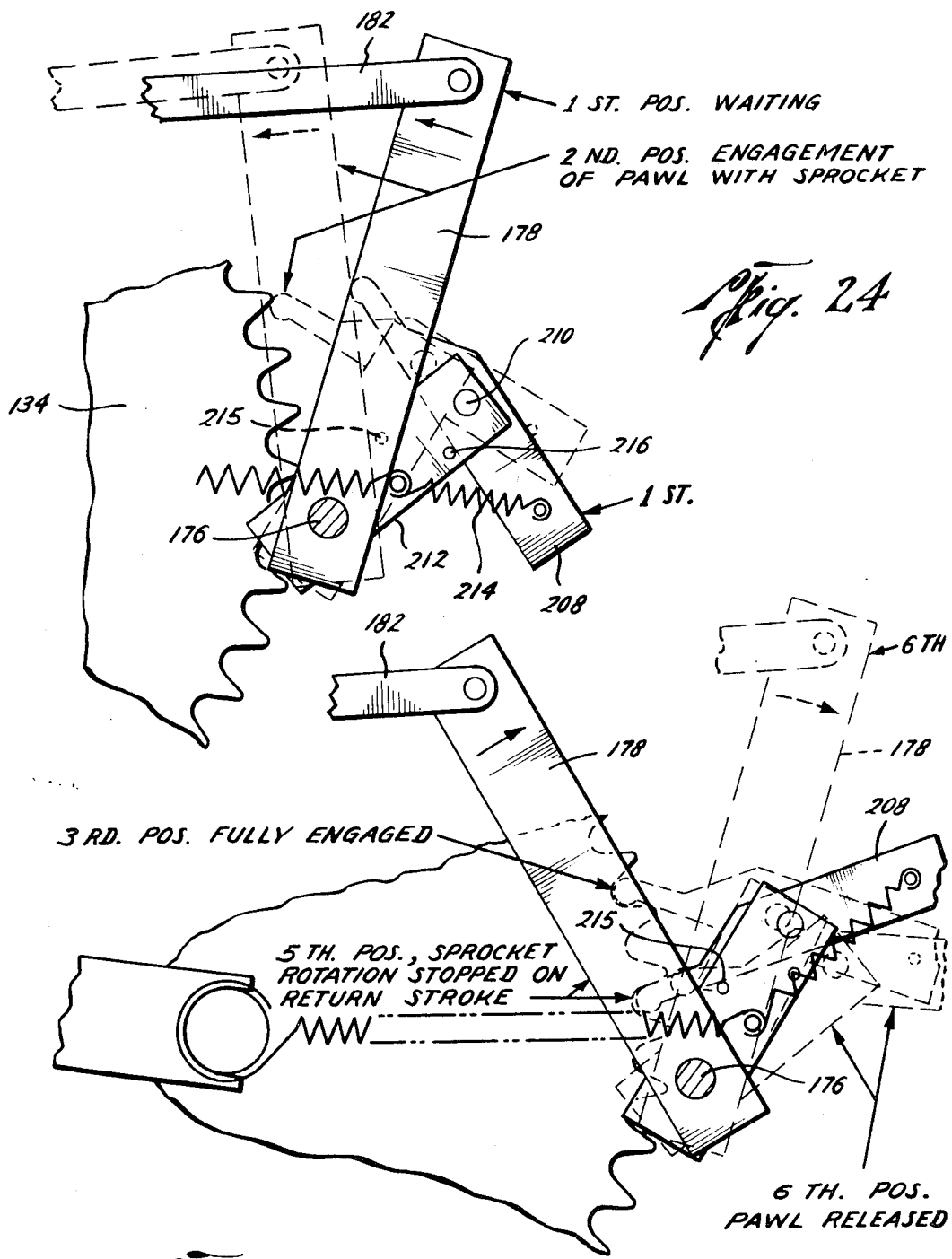

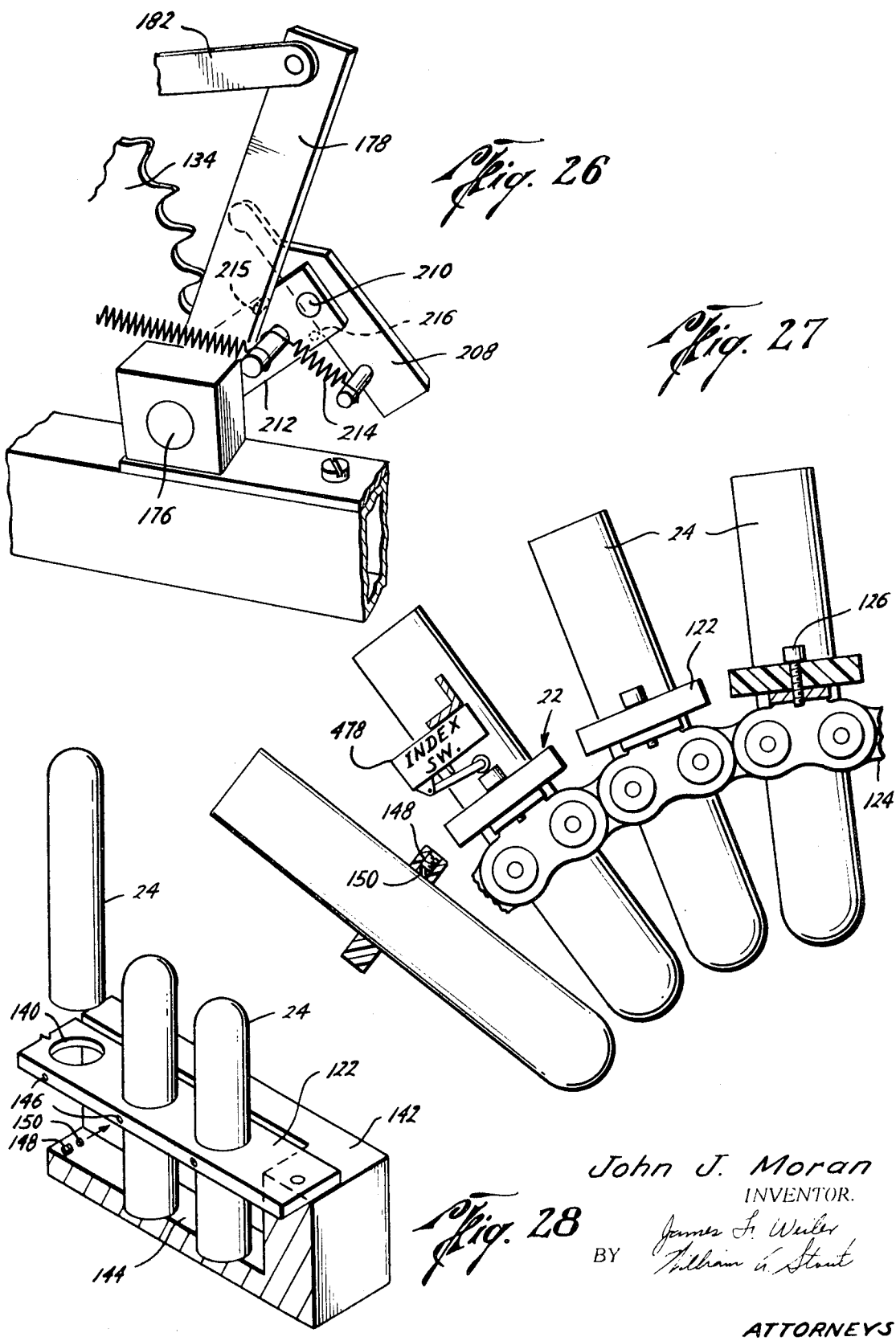

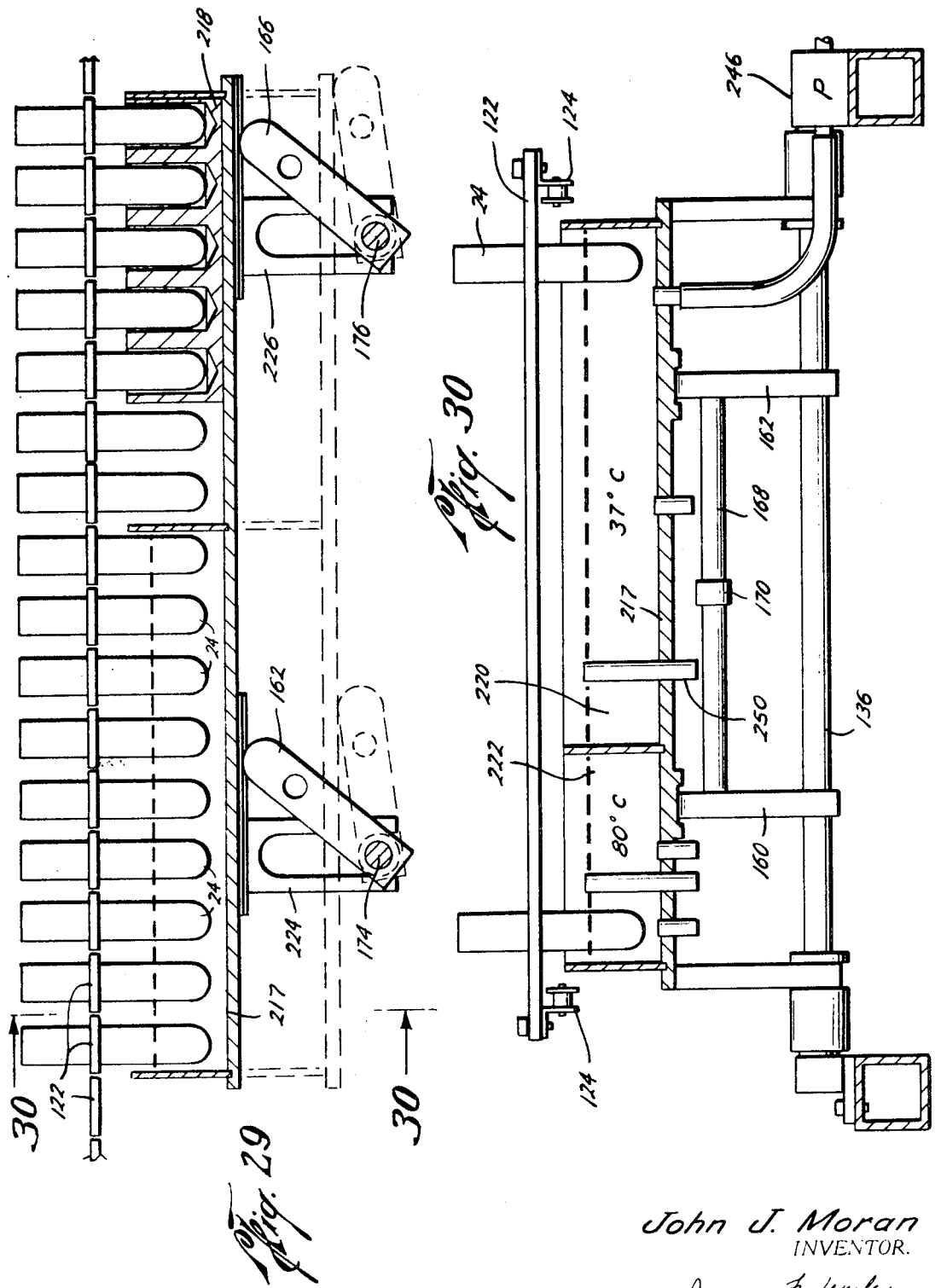

March 27, 1973 J. J. MORAN 3,723,066
REAGENT DISPENSING MEANS FOR CHEMICAL TESTING APPARATUS
Original Filed June 14, 1968 33 Sheets-Sheet 18

John J. Moran
INVENTOR.

BY James F. Weiler
William A. Stout

ATTORNEYS

March 27, 1973 J. J. MORAN 3,723,066
REAGENT DISPENSING MEANS FOR CHEMICAL TESTING APPARATUS
Original Filed June 14, 1968 35 Sheets-Sheet 19
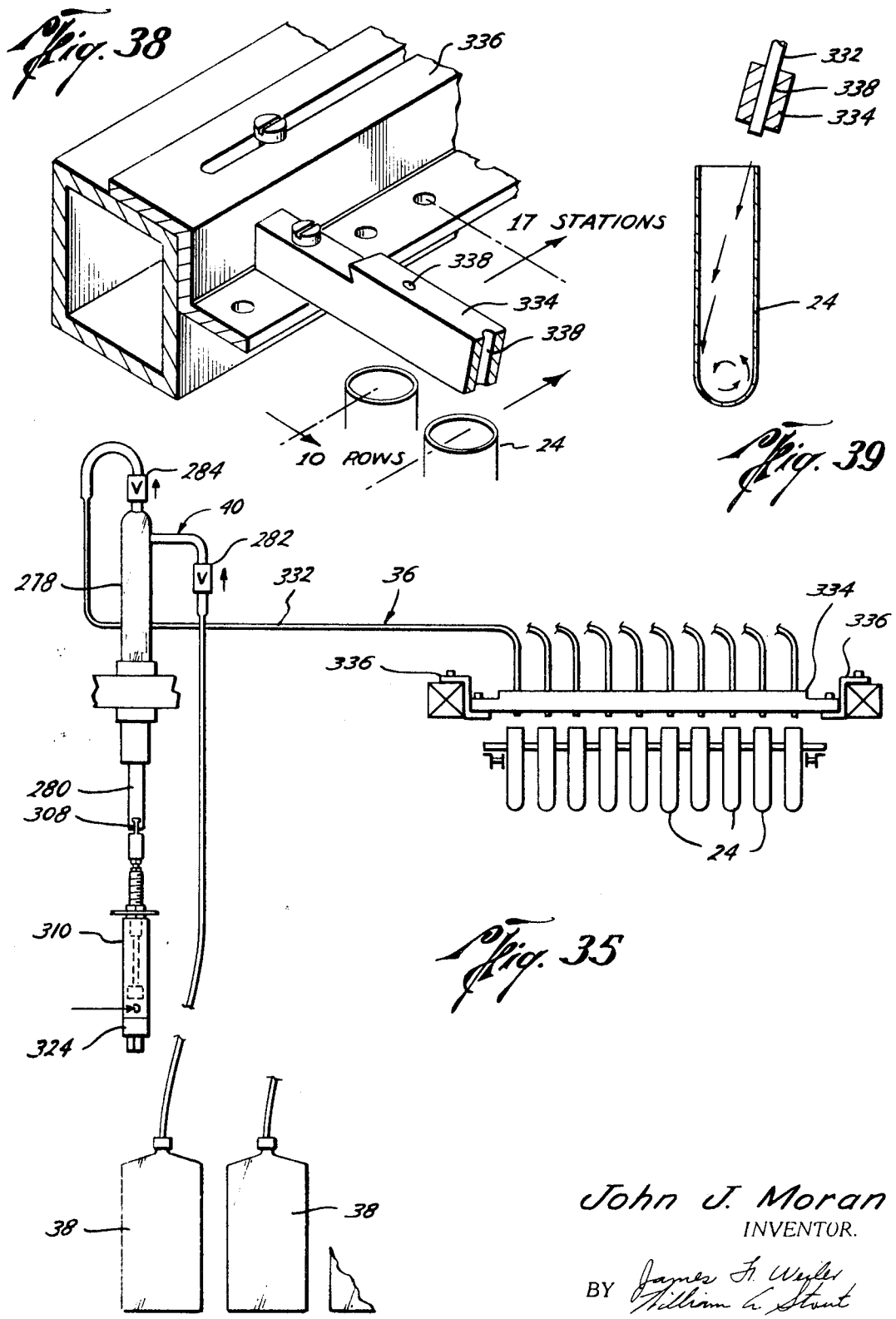
John J. Moran
INVENTOR.
BY James F. Weyler
William L. Stout
ATTORNEYS

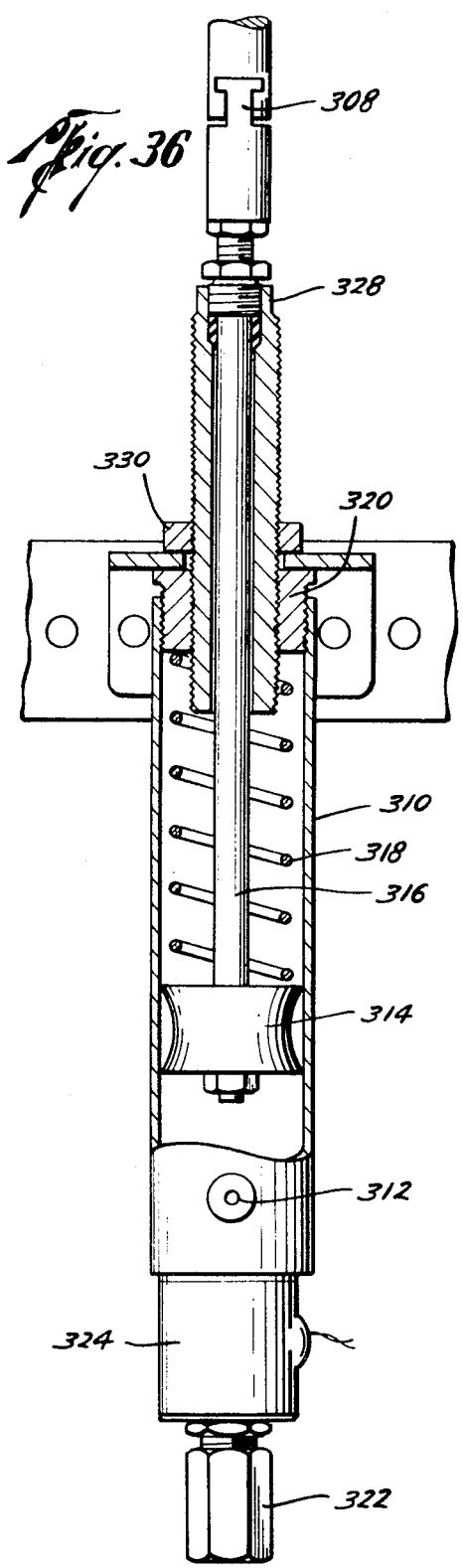
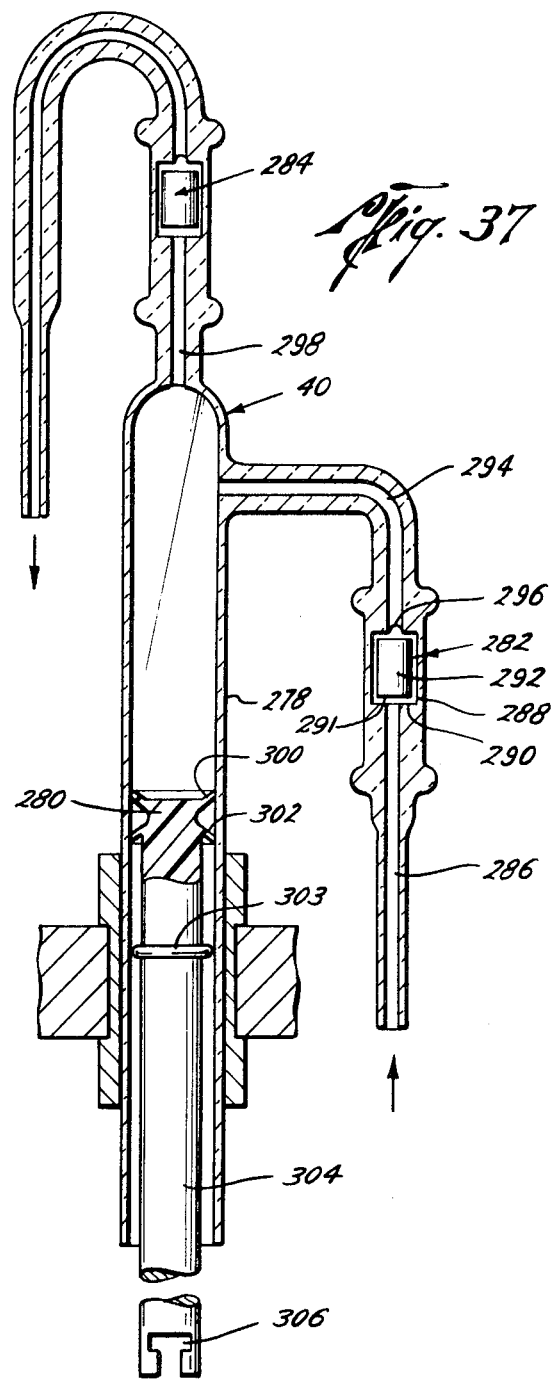

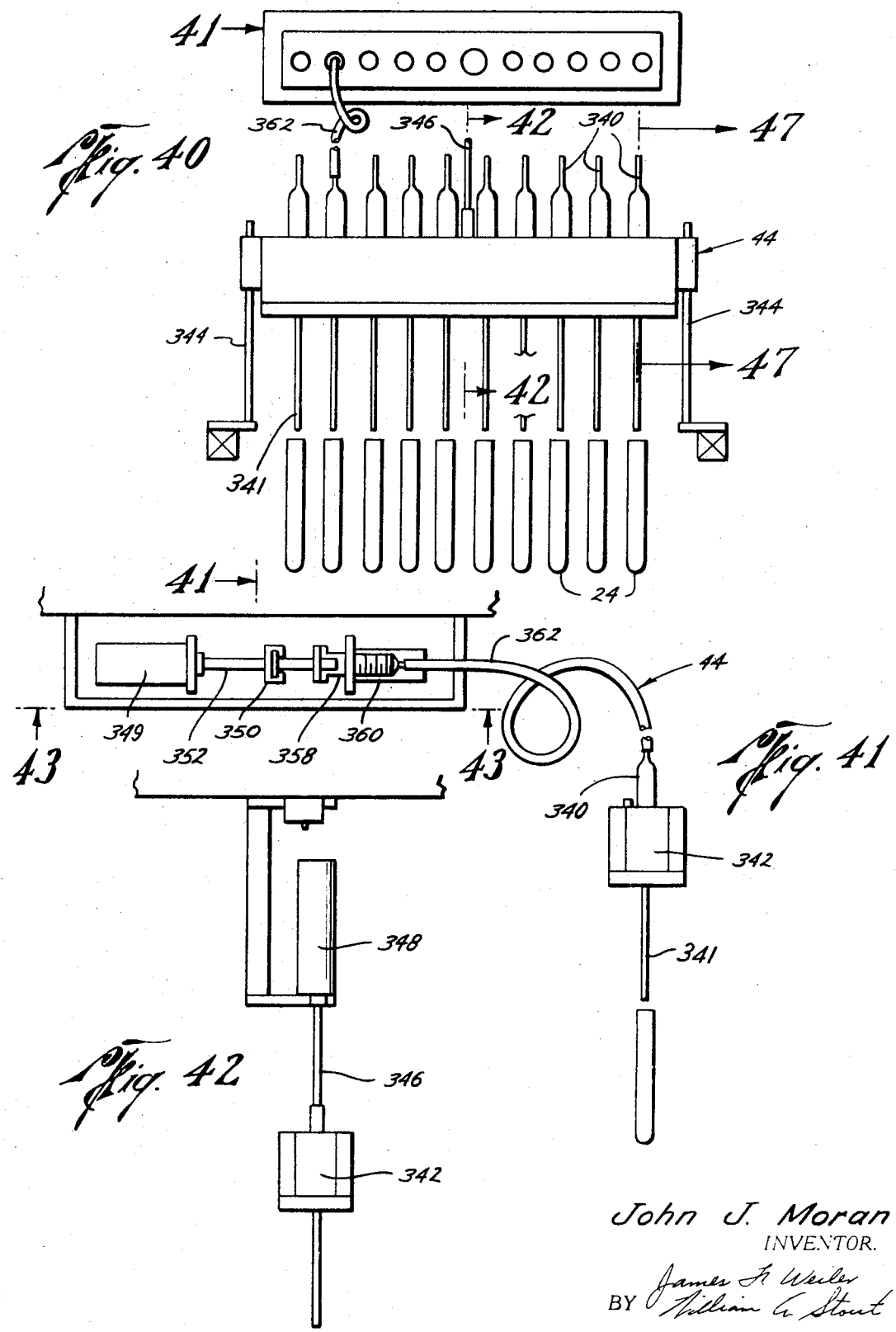

John J. Moran
INVENTOR

BY James F. Weiler
William G. Stout

ATTORNEYS

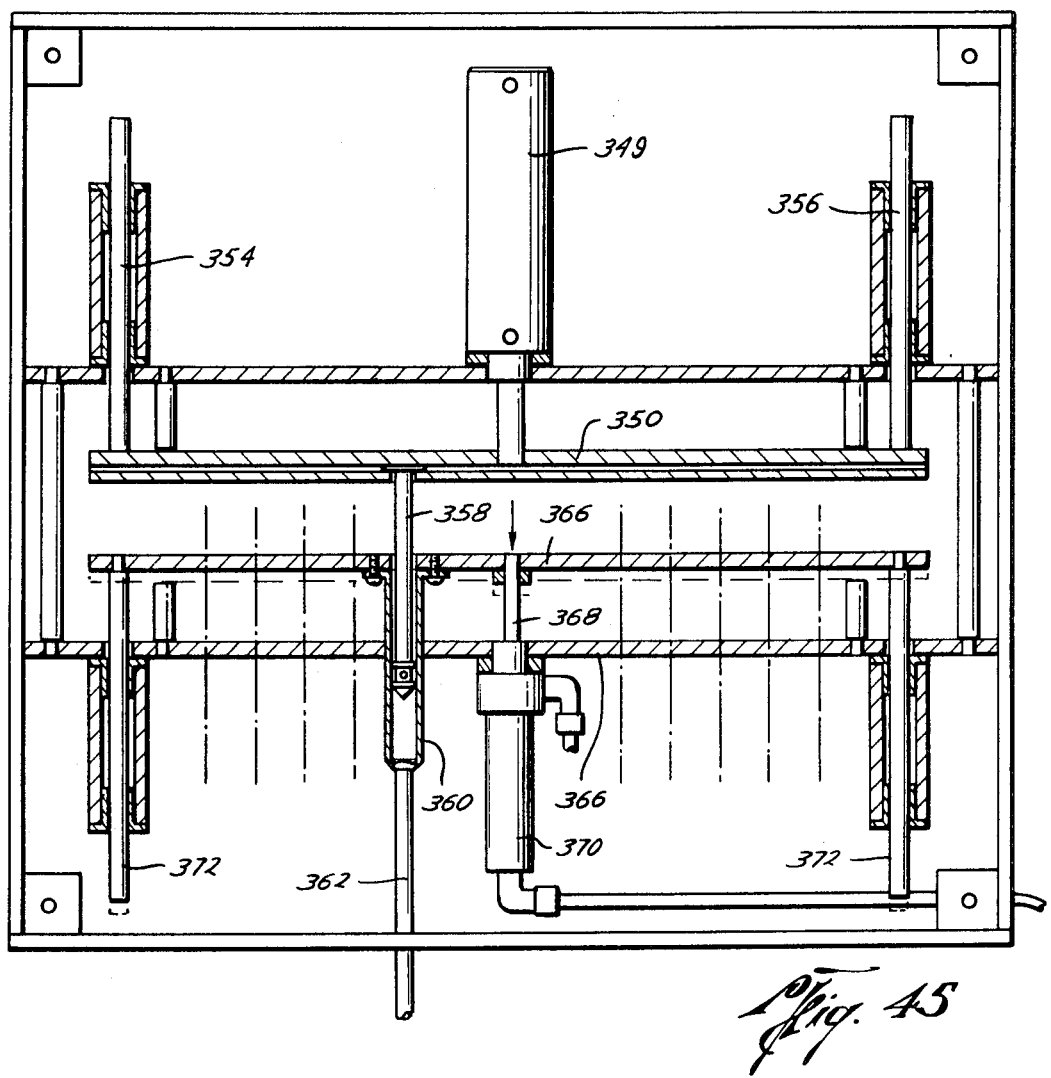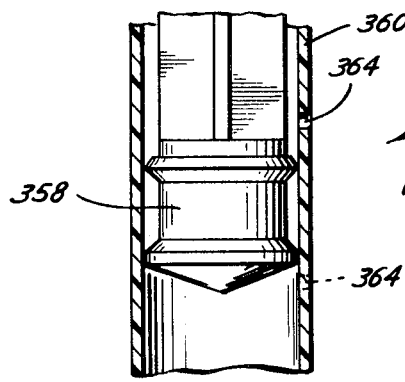

March 27, 1973 J. J. MORAN 3,723,066
REAGENT DISPENSING MEANS FOR CHEMICAL TESTING APPARATUS
Original Filed June 14, 1968 33 Sheets-Sheet 24

John J. Moran
INVENTOR.

BY James L. Weiler
William L. Stout

ATTORNEYS

John J. Moran
INVENTOR.

ATTORNEYS

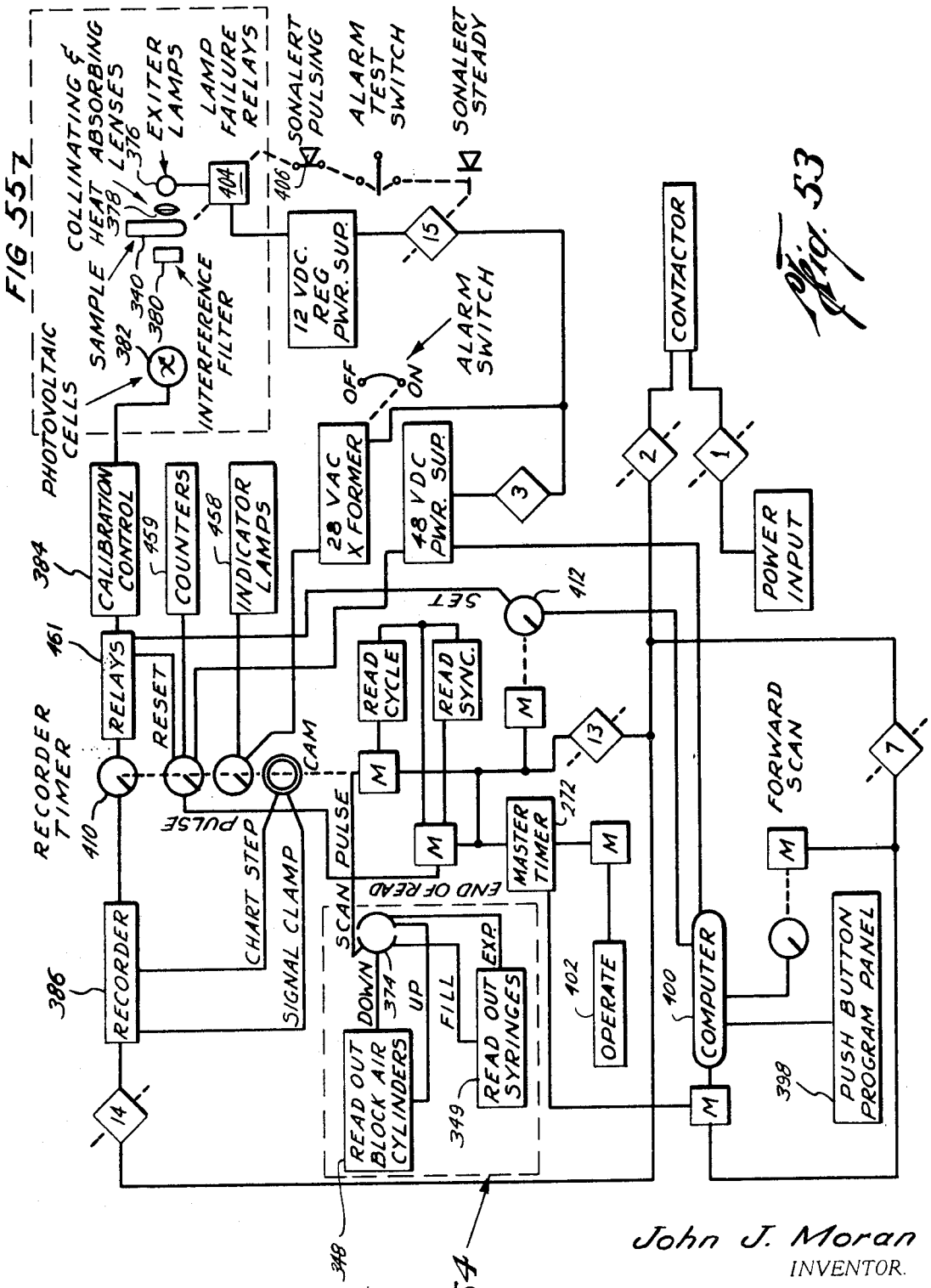

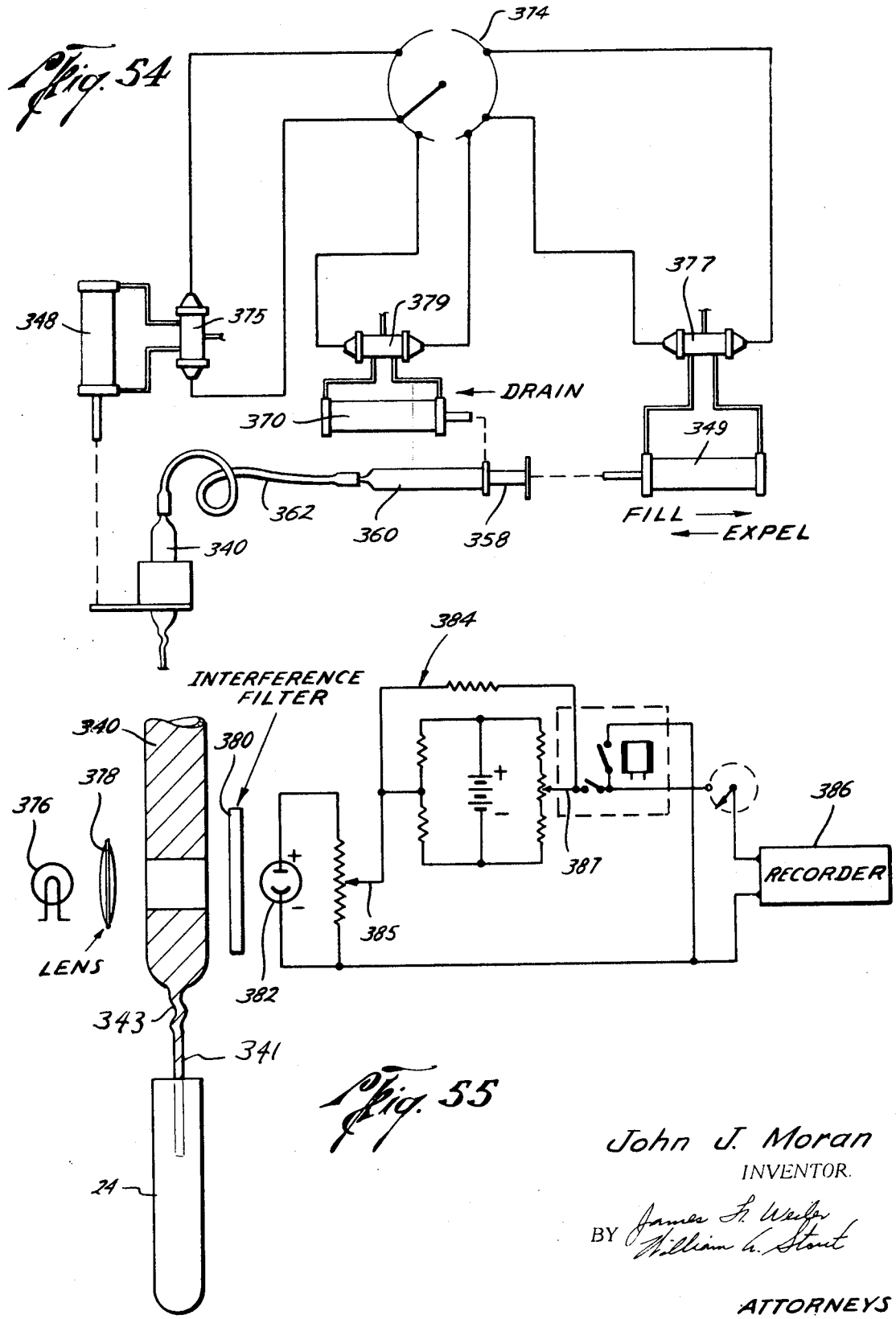

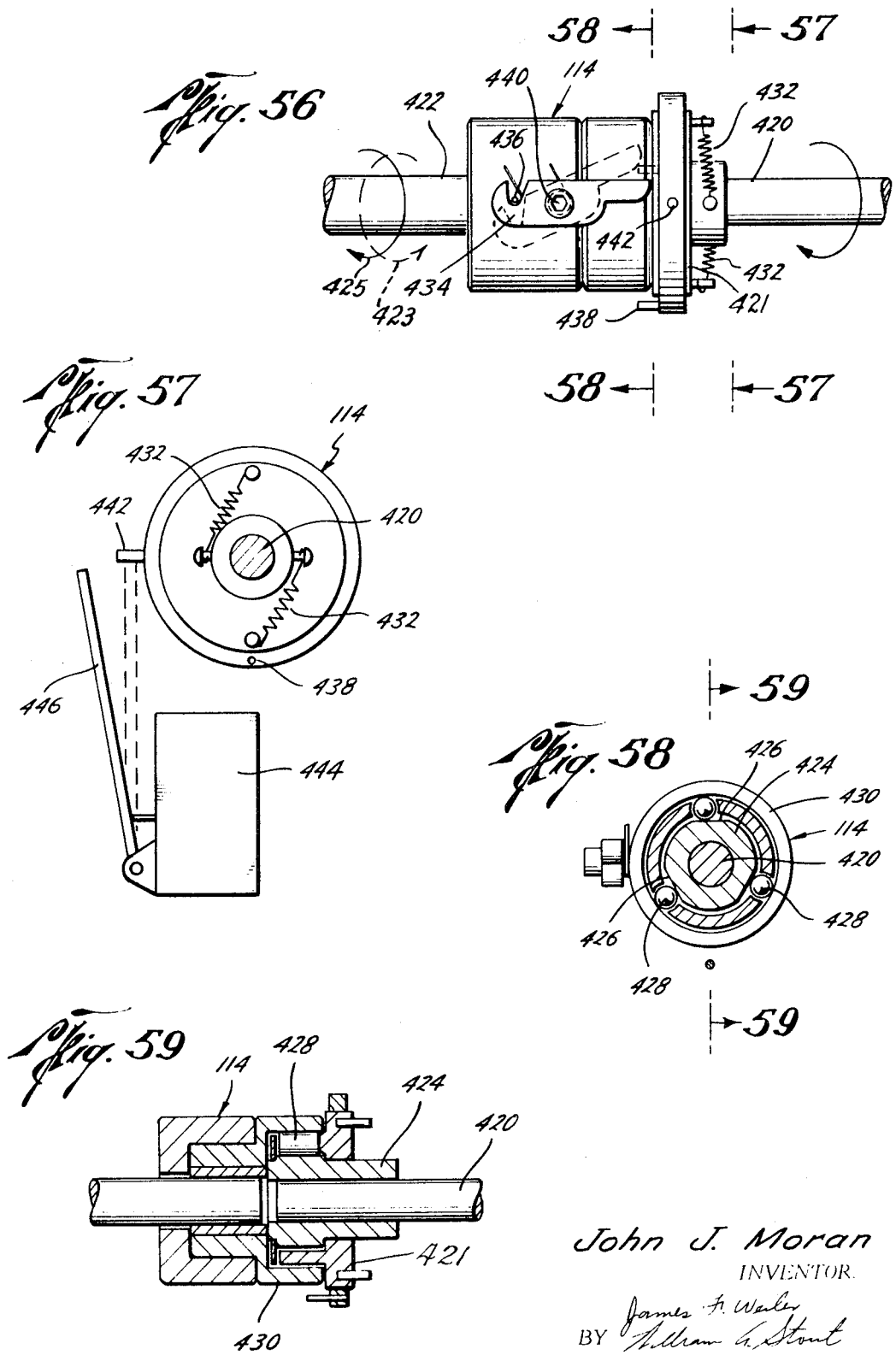

March 27, 1973  J. J. MORAN  3,723,066
REAGENT DISPENSING MEANS FOR CHEMICAL TESTING APPARATUS
Original Filed June 14, 1968  35 Sheets-Sheet 29
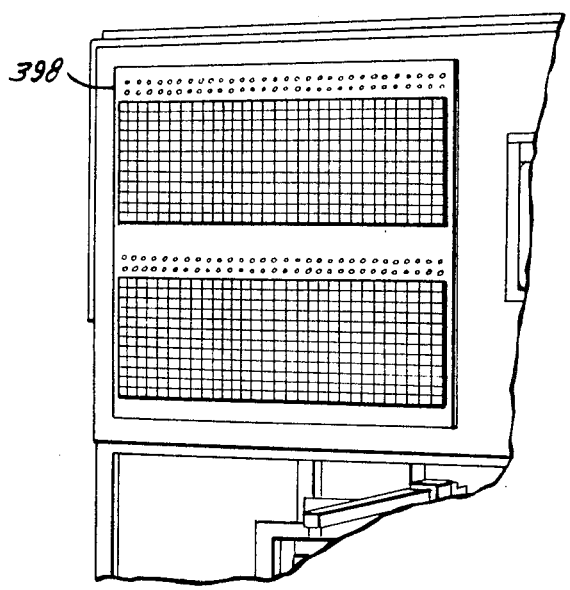
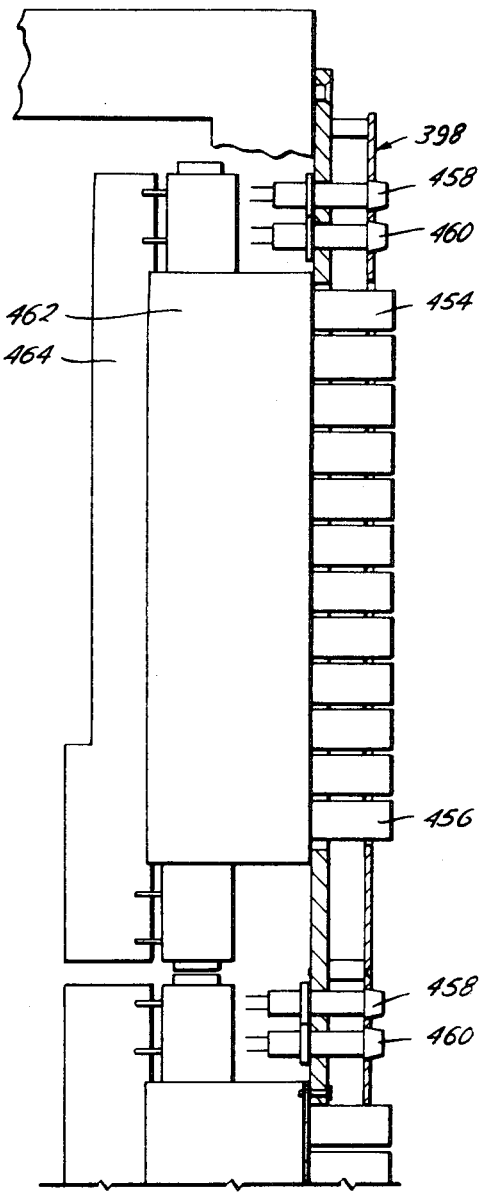
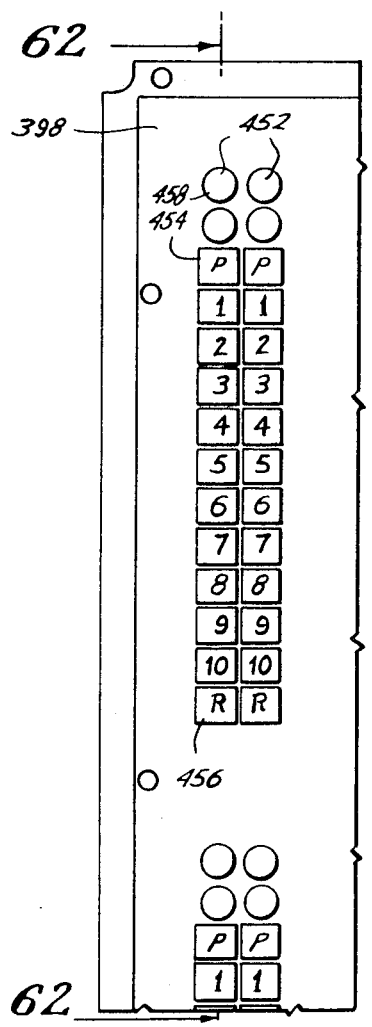
John J. Moran
INVENTOR.
BY James L. Weiler
William A. Stout
ATTORNEYS

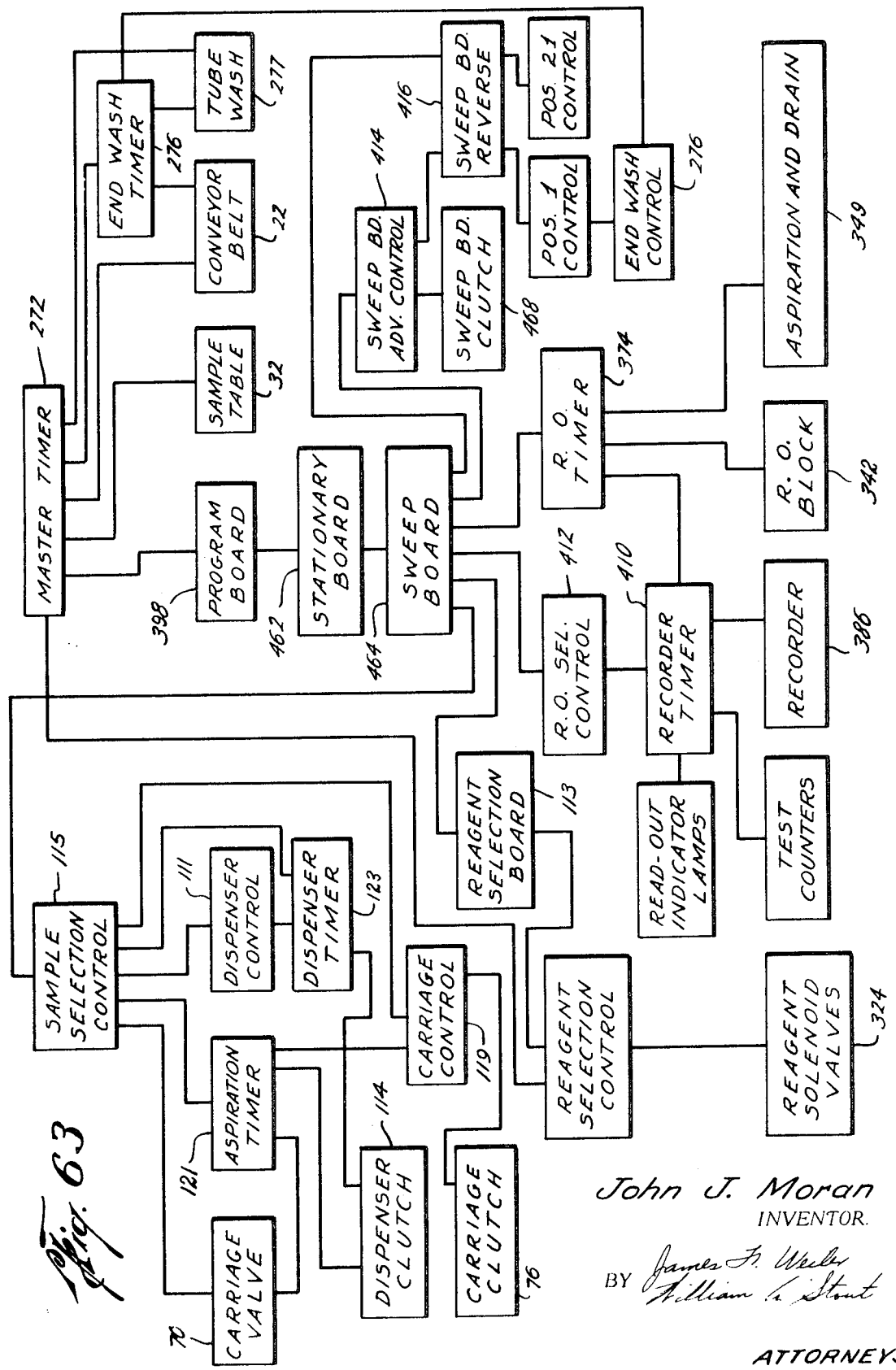

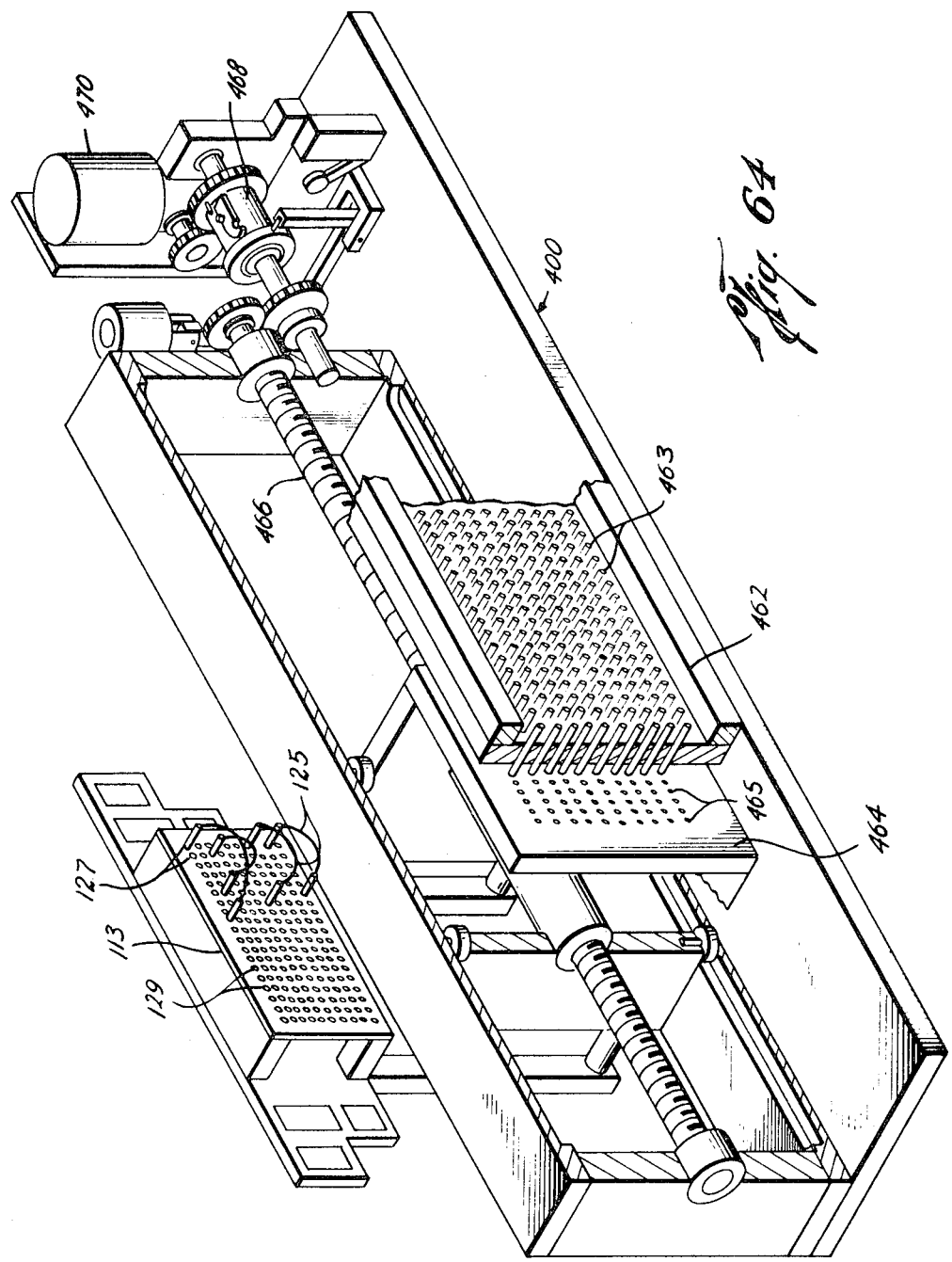

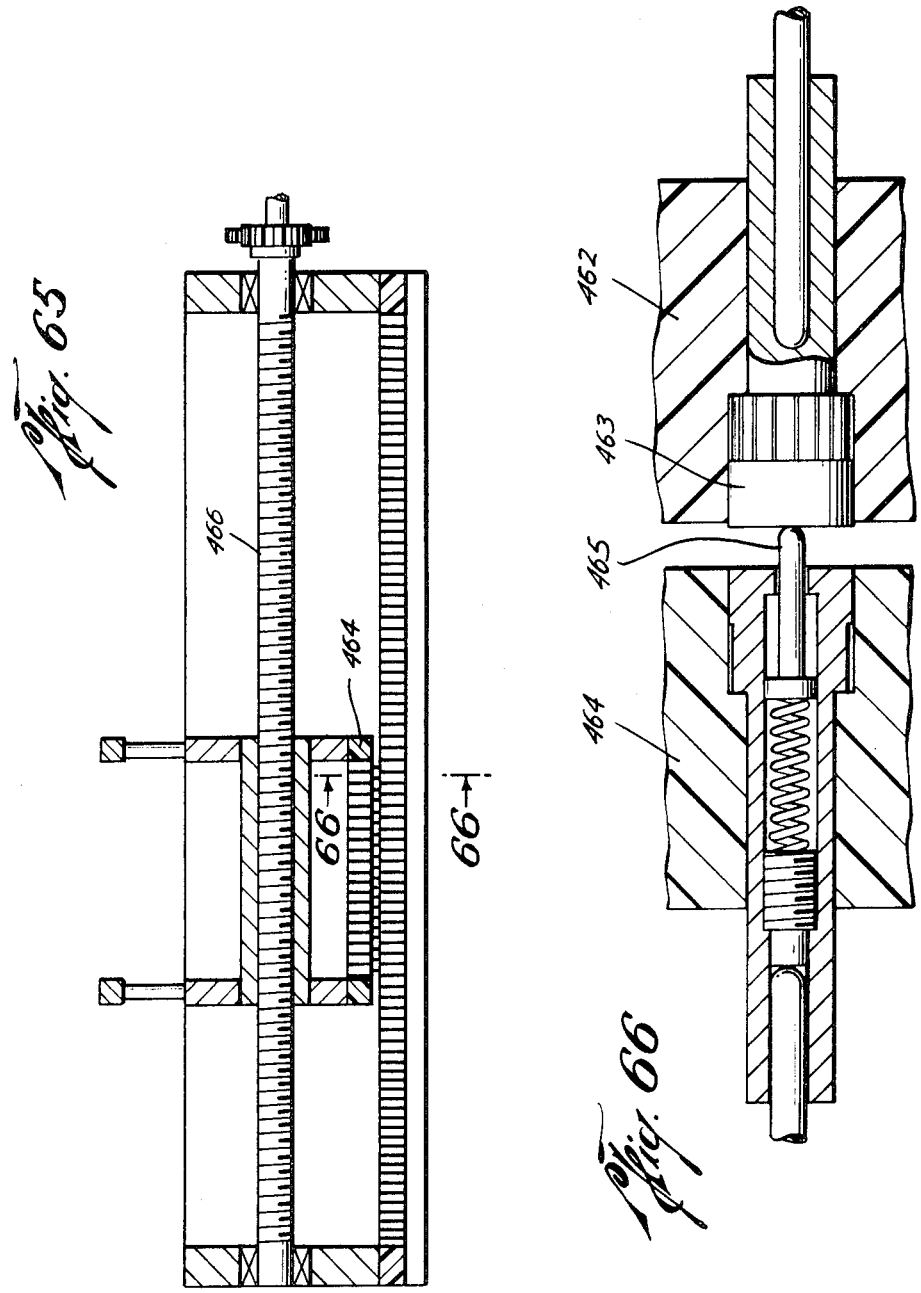

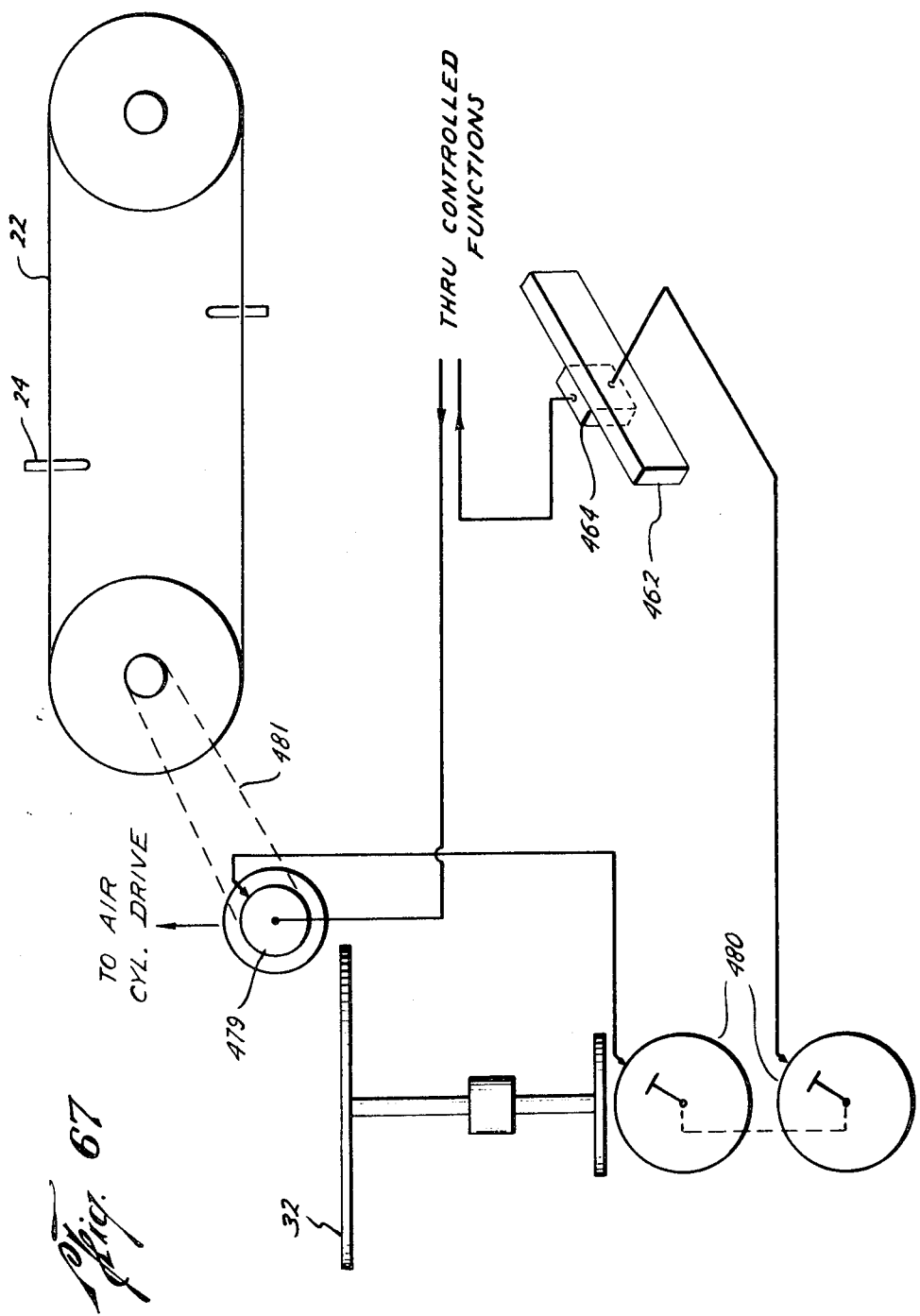

United States Patent Office 3,723,066
Patented Mar. 27, 1973

3,723,066
REAGENT DISPENSING MEANS FOR CHEMICAL TESTING APPARATUS
John J. Moran, Houston, Tex., assignor to Hycel, Inc., Houston, Tex.
Original application June 14, 1968, Ser. No. 737,065, now Patent No. 3,622,279. Divided and this application June 21, 1971, Ser. No. 155,156
Int. Cl. G01n 1/18, 33/16
U.S. Cl. 23—253 R                                6 Claims

ABSTRACT OF THE DISCLOSURE

An improved reagent dispensing means for use with an automatic chemical testing apparatus having a cylinder and piston of inert material with two one-way glass check valves having ground glass flat seating surfaces providing accurate control and metering of reagent therethrough. The outlet line of the reagent dispensing means is at an angle to the axis of the receiving tubes in the chemical testing apparatus to intimately mix the reagent with the contents of the tubes without requiring a stirrer. The reagent piston and cylinder assembly are loosely connected to a driving means whereby alignment of the piston and the cylinder is unaffected by the driving means.

CROSS-REFERENCES TO RELATED APPLICATIONS

This application is a division application of co-pending application Ser. No. 737,065 filed June 14, 1968, entitled Automatic Chemical Testing Apparatus, now U.S. Pat. No. 3,622,279.

BACKGROUND OF THE INVENTION

The present invention relates to improvements in an automated chemical testing apparatus which provides automation of routine chemistry procedures to provide more uniform procedures, greater efficiency, accuracy and at a lower unit cost than can be performed manually as well as providing discretionary selectivity of the tests to be performed on each sample. The present apparatus can generally automate most laboratory tests than can be performed in a single reaction tube by automatically and selectively picking up the test samples and dispensing the proper amounts in the programmed reaction tube, applying the necessary reagents at the appropriate position, heating the desired tubes to the proper temperatures, optically analyzing the results of the chemical tests, and washing and drying the tubes in preparation for the next tests.

SUMMARY

The present invention is directed to various improvements in an automated chemical testing apparatus in which a conveyor is provided for carrying and recycling a plurality of rows of reaction tubes from one position to the other in which a program control board is provided for selecting all or any combinations of various tests on each sample, which tests are automatically performed, the results recorded, and the components are recycled for continuous operation.

One improvement in the present apparatus is the provision of a loop conveyor including a plurality of substantially rigid slats transversely positioned and each slat including openings for securely supporting a row of reaction tubes intermediate their ends from the conveyor with the open tube ends extending upwardly above the top of the portion of the conveyor and the lower closed tube ends extending beneath the upper portion of the loop whereby chemical tests may be performed in the inverted and the contents thereafter emptied as the conveyer is rotated whereby the tubes will be in an upside-down position for cleaning.

A still further object of the present invention is the provision of a tube heating means positioned inside the loop and movable upwardly for heating the bottom of at least some of said tubes positioned on the upper portion of the loop, and movable downwardly for allowing the conveyor to rotate, and tube drying means positioned outside the conveyor and movable into the tubes for drying the tubes and movable out of the tubes for allowing the conveyor to rotate, and the provision of the mechanical linkage which automatically synchronizes the indexing conveyor movement with the lowering and raising of the tube heating means and retracting and extending of the tube drying means, and further includes means engaging the conveyor for allowing the conveyor to index only a predetermined distance, and locking means engaging the conveyor for locking the conveyor in position between indexing movements.

A further object of the present invention is to provide an improved means for dispensing test samples into the tubes which includes a rotary sample table supporting the test samples, a pick up and dispensing conduit connected to a water filled line with a cylinder and piston assembly connected to the line for aspiration of a sample from the sample table and for dispensing portions of the sample into programmed tubes with a threaded screw actuating the assembly for accurately controlling the amount of sample picked up or dispensed, and including an air interface piston and cylinder connected to the line for creating air interfaces in the line for reducing any dilution effects or contamination effects on the dispensed samples, and further including cleaning means for flushing cleaning media through the conduit and line for reducing the possibility of contamination between test samples.

Still another feature of the present invention is the provision of metered means for injecting reagents into the reaction tubes which includes a cylinder and piston positioned between two one-way check valves, which check valves include flat ground glass valves for providing a positive seal and which are inert to the reagents and in which the outlet lines from the dispensing means is directed into the reagent at an angle to the axis of the reaction tubes to create a desired mixing action between the reagent and the contents of the tubes, and in which driving means are loosely connected to the piston in a transverse direction to avoid misalignment of the piston in the cylinder.

A still further object of the present invention is the provision of optical readout means wherein a plurality of cuvettes having elongated passageways may be lowered into and the contents of the reaction tubes aspirated into the cuvettes and wherein the optical readout sequentially scans the cuvettes and the results of the tests are suitably recorded, and in which the aspiration is provided by a cylinder and piston wherein the cuvettes are drained after the tests and are additionally cleaned by a sharp burst of air to provide a low residual surface factor which reduces carryover to chemically insignificant levels, and a serpentine passageway is provided in the cuvette to prevent aspiration of the samples out of the cuvettes.

Another feature is the provision of an optical readout system in which a lens having phosphate glass is utilized to reduce the admissibility of heat from the light source from adversely affecting the results of the readout, and a filter is positioned between the cuvette and the light measuring device thereby spacing the filter from the light source and reducing the adverse effect of heat on the filter.

Yet a still further feature of the present invention is the provision of a computerized programming control system for providing a discretionary and selective cona programmed selection control board having an actuatrol of the tests to be run on each sample which includes ing switch for each tube for selectively programming the chemical tests to be conducted on each sample and in which the computer includes a first contact board electrically connected to the control board and a second contact board movably indexed relative to the first contact board in synchronization with the conveyor and electrically connected to and controlling the sample dispensing means, the reagent injection means and the readout means as the second board indexes relative to the first board and the actuating switches of the first board are electrically connected to the second board, and further including a reagent selection board having a plurality of position receptacles corresponding to each possible position for injecting reagents into the tubes, and electrical connections for selectively connecting each of the position receptacles to the desired reagent injecting means.

BRIEF DESCRIPTION OF THE DRAWINGS

FIG. 2 is a front skeleton elevational view of the apparatus of FIG. 1, FIG. 3 is a rear skeleton elevational view of the appartus of FIG. 1, FIG. 4 is an elevational view of one example of a plurality of reaction tubes showing the position of a sample entry station, the reagent stations, the heating stations, the readout stations, and indicating possible types of tests that can be performed.

FIG. 5 is a diagrammatic elevational view of the conveyor of the present apparatus carrying the reaction tubes, and also indicating possible tube wash and dry stations, FIG. 6 is an electrical schematic showing the power supply to the various components of the apparatus, FIG. 6A is a view of the circuit breaker board, FIG. 7 is a fragmentary elevational view, partly in section, illustrating the sample pick up and dispensing components of the present invention, FIG. 8 is a view taken along the line 8—8 of FIG. 7, FIG. 9 is a view taken along the line 9—9 of FIG. 7, FIG. 10 is a view taken along the line 10—10 of FIG. 9, FIG. 11 is a view taken along the line 11—11 of FIG. 9, FIG. 14 is a schematic and perspective view, partly in cross section, illustrating the hydraulic sample pick up and dispensing assembly, FIG. 15 is a view taken along the line 15—15 of FIG. 14, FIG. 16 is a schematic view of the operation and control of the pick up and dispensing assembly of the present apparatus, FIG. 19 is a view taken along the line 19—19 of FIG. 17, FIG. 20 is a view taken along line 20—20 of FIG. 19, FIG. 22 is an elevational view, partly in cross section, of the actuating linkages for indexing the conveyor, raising and lowering the heater baths, and extending and retracting the tube drying means, and showing the linkages in their first and second positions, FIG. 23 is a view similar to FIG. 22 showing the actuating linkages in their fourth and fifth positions, FIG. 24 is an enlarged fragmentary elevational view, partly in cross section, illustrating the operation of an indexing pawl engaging the sprocket wheel of the conveyor and shown in its first and second positions, FIG. 25 is a view similar to FIG. 24 illustrating the position of the indexing pawl in its third, fifth and sixth positions, FIG. 26 is an enlarged fragmentary perspective view, partly in cross section, of the indexing pawl of the FIGS. 24 and 25, FIG. 27 is an enlarged elevational view of a portion of the conveyor illustrating details of construction, FIG. 28 is an enlarged fragmentary perspective view illustrating a method of securing the reaction tubes to the slats of the conveyor, FIG. 29 is a fragmentary cross-sectional view of the conveyor of the present apparatus illustrating the position of the heating baths relative to the reaction tubes, FIG. 30 is a view taken along the line 30—30 of FIG. 29, FIG. 35 is an enlarged fragmentary elevational view, partly in cross section, illustrating schematically the connections of the reagent dispensing assembly, FIG. 36 is an enlarged elevational view, in cross section, illustrating the lower portion of one of the reagent metering assemblies, FIG. 37 is an enlarged elevational view in cross section of the upper portion of the reagent metering dispensing assembly of FIG. 36, FIG. 38 is an enlarged fragmentary perspective of the connection of the supports for the outlet line of the reagent dispensing assembly at a position above the reagent tubes, FIG. 39 is an enlarged fragmentary elevational view, in cross section, showing the position of the outlet line of a reagent dispensing assembly relative to a reaction tube, FIG. 40 is an enlarged elevational view of the readout assembly, FIG. 41 is a view taken along the line 41—41 of FIG. 40, FIG. 42 is a view taken along the line 42—42 of FIG. 40, FIG. 45 is a view similar to FIG. 43 illustrating the movement of the cylinder relative to the piston for draining the curvettes, FIG. 46 is a view similar to FIG. 44 showing the relationship of the cylinder and drain port relative to the piston for draining the cuvettes, FIG. 53 is an electrical and mechanical schematic of the readout system, FIG. 54 is a mechanical and electrical schematic of the mechanical operation of the testing assembly, FIG. 55 is a mechanical and electrical schematic of the optical readout system of the present apparatus, FIG. 56 is an enlarged fragmentary elevational view, partly in cross section, illustrating the two-way clutch assembly used in the present apparatus, FIG. 57 is a view taken along the line 57—57 of FIG. 56, FIG. 58 is a view taken along the line 58—58 of FIG. 56, FIG. 59 is a view taken along the line 59—59 of FIG. 58, FIG. 60 is a fragmentary view of the program control board of the present apparatus, FIG. 61 is an enlarged fragmentary view of the program control board illustrating the actuating switches and indicating lights, FIG. 62 is a cross-sectional view taken along the line 62—62 of FIG. 61, FIG. 63 is an electrical block diagram of the control system of the present invention, FIG. 64 is an enlarged fragmentary elevational view, partly in cross section, showing the mechanical structure of the computer of the present apparatus, FIG. 65 is a cross sectional view of the sweep and fixed boards of the computer of the present invention showing the mode of indexing of one relative to the other, FIG. 66 is an enlarged cross-sectional view taken along the line 66—66 of FIG. 65, and FIG. 67 is an electrical schematic of the synchronization circuit of the present apparatus.

DESCRIPTION OF THE PREFERRED EMBODIMENTS

Figure 1:
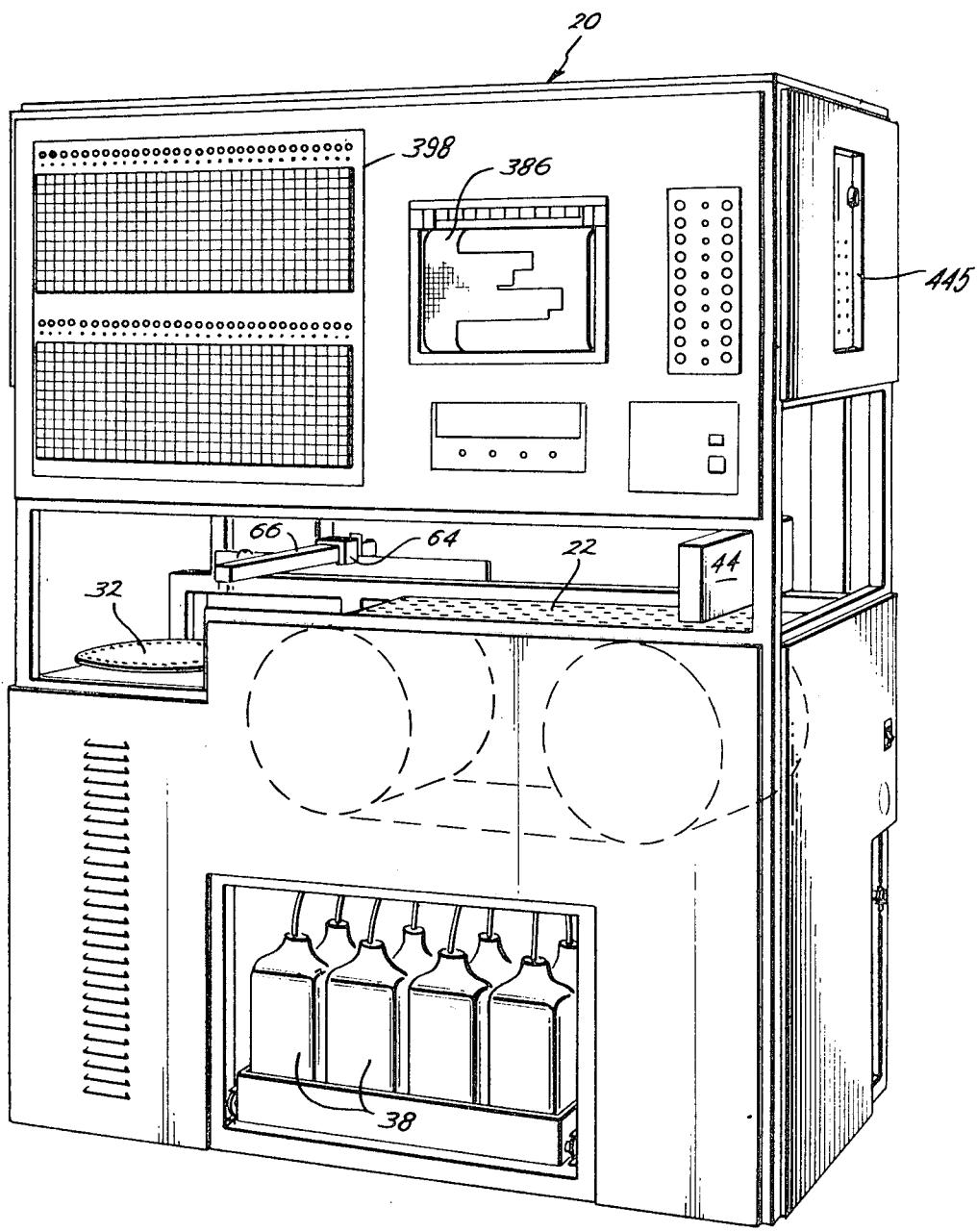
FIG. 1 is a prespective overall view of a preferred apparatus of the present invention.

Referring now to the drawings and particularly to FIGS. 1 through 5, the automatic chemical testing apparatus or discretionary sequential multiple analysis apparatus of the present invention is generally indicated by the reference numeral 20 and generally includes (1) a loop conveyor or endless belt 22 which carries a plurality of rows of open topped containers or reaction tubes 24 in which the various separate longitudinal rows 26 indicate different chemical tests which may be performed while each separate transverse row 28 is provided to receive a single individual sample on which the various tests may be performed as the conveyor 22 is sequentially indexed carrying the reaction tubes 24 along various stations at which various steps in the chemical testing are performed, (2) a sample dispensing assembly 30 which may include a rotary indexing table 32 for holding the samples to be tested and a pick up and dispensing apparatus 34 for picking up the required amount of sample from the indexing table 32 and dispensing each sample in a single transverse row 28 of tubes 24 in the required amounts and for the tests programmed, (3) a reagent dispensing assembly 36 which may include a plurality of containers of reagents 38 connected to metered dispensing units 40 which in turn are connected to outlets positioned above the reaction tubes 24 at the desired position or station on the conveyor 22 for dispensing reagents in the proper sequence and at the proper station in the tests being performed, (4) suitable heating means 42 which are positioned for heating the reaction tubes 24 at the desired stations as the tubes 24 are indexed along the conveyor 22 as required by the chemical tests being performed, (5) a readout or testing assembly 44 for analyzing the results of the chemical tests being performed. (6) cleaning means for cleaning the tubes 24 after the tests in a particular transverse row 28 has been concluded, (7) tube drying means for drying the tubes in preparation for reuse and recycling, and (8) suitable control means for selectively controlling the sequential multiple analysis and synchronization of the above mentioned components.

By way of example, the apparatus 20 will be described in use in running a multiple number of tests on blood serum although, of course, the present apparatus can be used for a variety of discretionary sequential multiple analysis chemistry that can be performed in a single reaction tube. For example only, and referring to FIGS. 4 and 5 a plurality of ten longitudinal rows 26 of sixty tubes 24 each are supported and sequentially indexed by the conveyor 22. As will be more fully described hereinafter, a test sample will be dispensed into one or more of the ten tubes in a single transverse row 28 and as the transverse row 28 is indexed, will become positioned at the various reaction positions or stations where the desired chemistry for the different tests performed in the individual longitudinal rows 26 will be performed such as heating, mixing, and adding of reagents to perform the desired chemical analysis, such as by example only, as listed in conjunction with the individual longitudinal rows 26 in FIG. 4, after which the transverse rows will reach the readout station which will analyze and record the measured values. After the end of the readout, as best seen in FIG. 5, the tubes 24 are inverted, draining the contents and pass through one or more wash stations and at least one drying station where they are again returned to the sample entry position or station for recycling.

Referring now to FIGS. 7 through 16, the sample dispensing assembly 30 includes a pick up and dispensing apparatus 34 which performs the function of moving towards the rotary indexing table 32 and picking up a sample to be tested and moves over one of the transverse rows 28 of reaction tubes 24 and injects a measured amount of sample into each of the tubes 24 therein for which a test has been programmed. The rotary indexing table 32 is best seen in FIGS. 7, 8, 9 and 16, and includes a plurality of sample containers 46 which may be inserted into a plurality of openings 48 which are circularly and evenly spaced on the indexing table 32. A water cooling jacket 50 may be positioned beneath the indexing table 32, as best seen in FIGS. 7, 8, and 9, having an inlet 54 and an outlet 56 to provide a temperature controlled environment for the test samples in the containers 46 in order that they are not adversely affected by temperature and particularly the heat generated by the components of the apparatus 20. A rotary table indexing motor 52 drives the table 32 through a gear box 58 at periodic intervals to incrementally index the sample containers 46 individually to a pick-up position in response to a control system which will be more fully described hereinafter.

The pick up and dispensing apparatus 34 includes a pick up and dispensing conduit such as needle 62 which is carried by a carriage car 64 which in turn is movable on and is supported by a carriage arm 66 which in turn is supported for a swinging movement about one end, as best seen in FIGS. 7, 8, 9, 10, 13 and 16, whereby the pick up and dispensing conduit or needle 62 may be moved over the sample container 46 on the indexing table 32 in the pick-up position, as best seen in the dotted outline in FIG. 7, to pick up a sample to be tested after which the carriage arm 66 is returned to the full line position shown in FIG. 7, over a transverse row 28 of tubes 24 for injecting portions of the sample into the individual tubes 24 for which the programmed tests are to be performed.

As best seen in FIGS. 7, 9, 12, 13 and 16, an air piston and cylinder 68 is connected to an arm 70, which in turn is connected to the carriage arm 66 for rotating the arm 66 and thus the carriage car 64 outwardly over the rotary indexing table 32 and, after a sample has been picked up, again retracting the carriage arm 66 into a position over a transverse row 28 of reaction tubes 24. The air supply for actuation and retraction of th piston and cylinder assembly 68 and thus the carriage arm 66 is supplied through an air valve 70 (FIG. 16).

Figure 12:
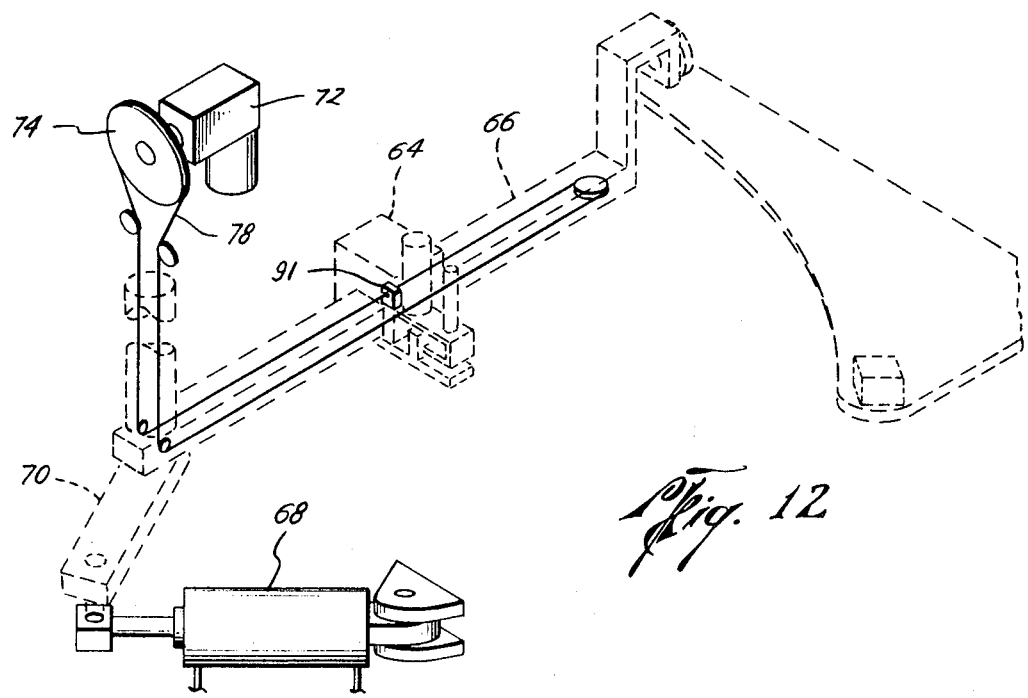
FIG. 12 is a diagrammatic perspective view of the operation of the carriage and car pick-up arm shown in a dispensing position.
Figure 13:
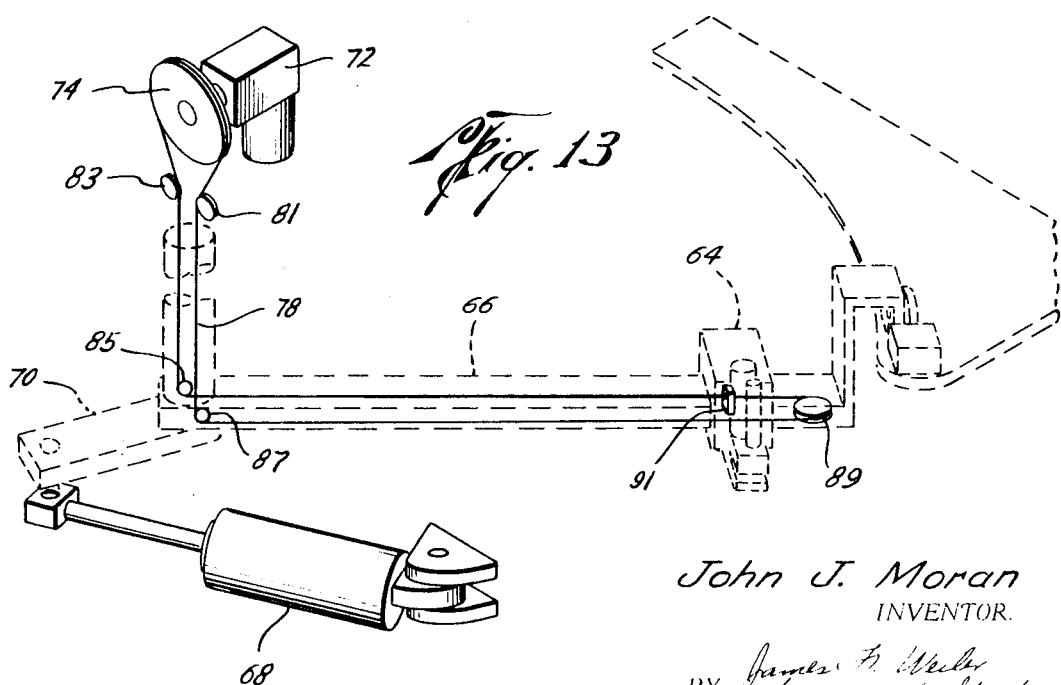
FIG. 13 is a view similar to FIG. 12 showing the carriage car and arm in a sample pick-up position.
Figure 17:
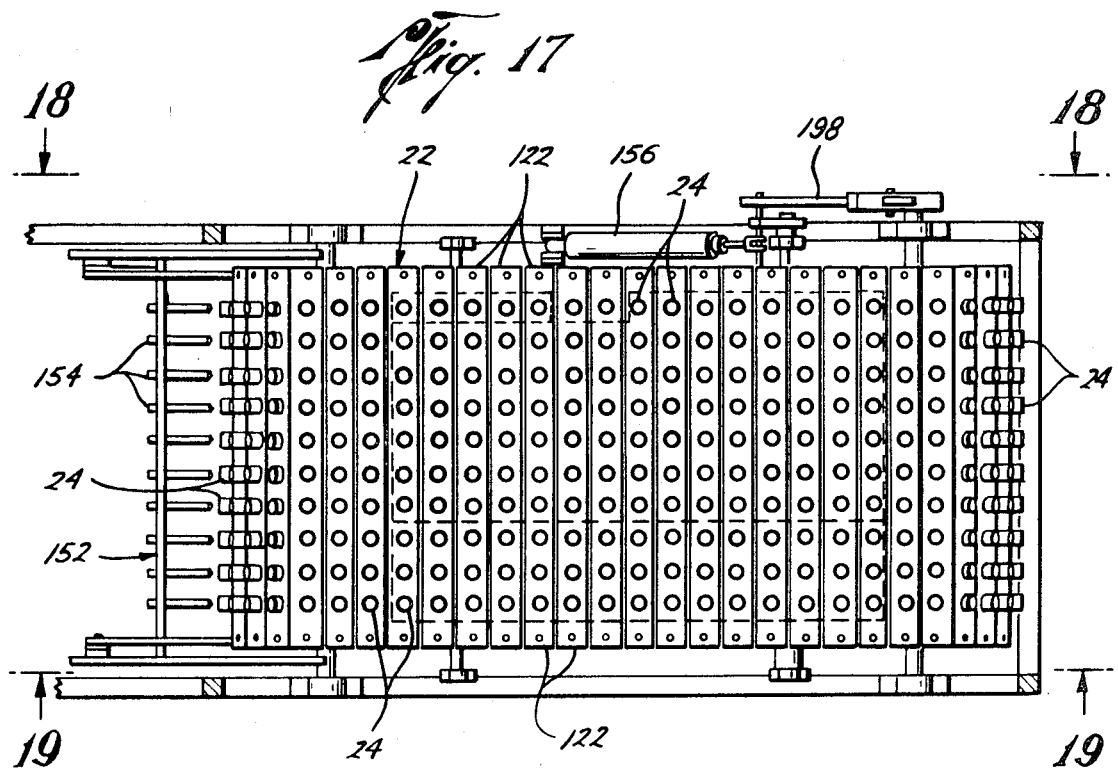
FIG. 17 is a fragmentary elevational view of the endless conveyor assembly supporting and carrying the reaction tubes.
Figure 18:
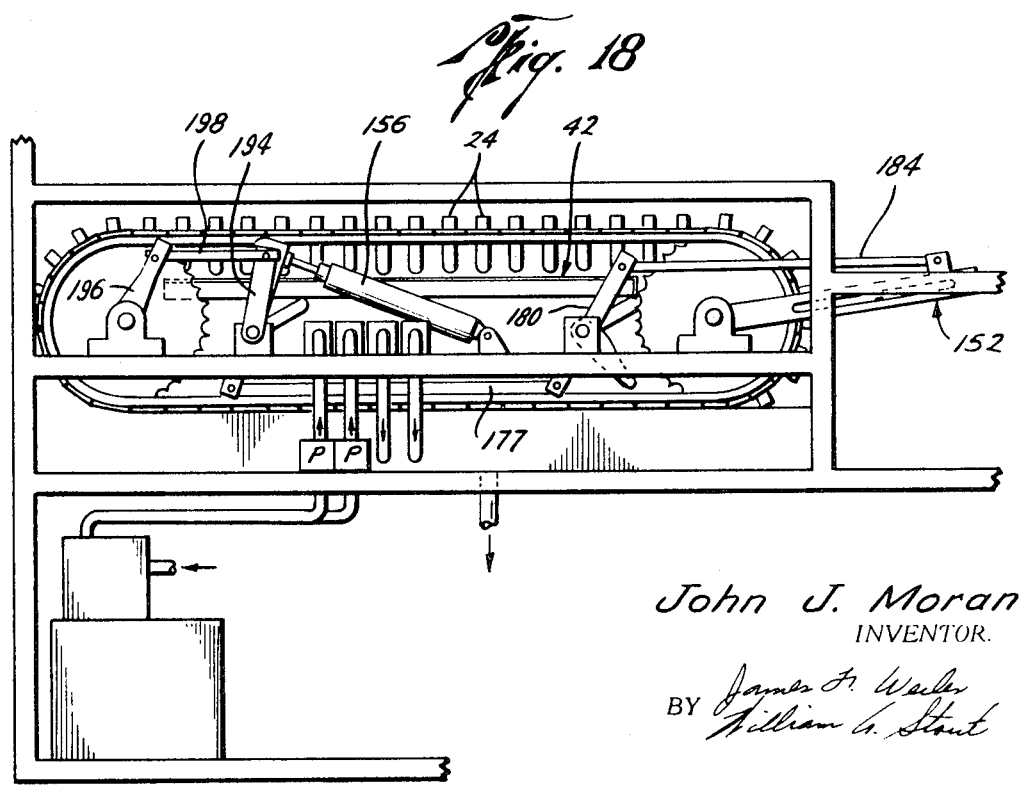
FIG. 18 is a view taken along the line 18—18 of FIG. 17.
Figure 21:
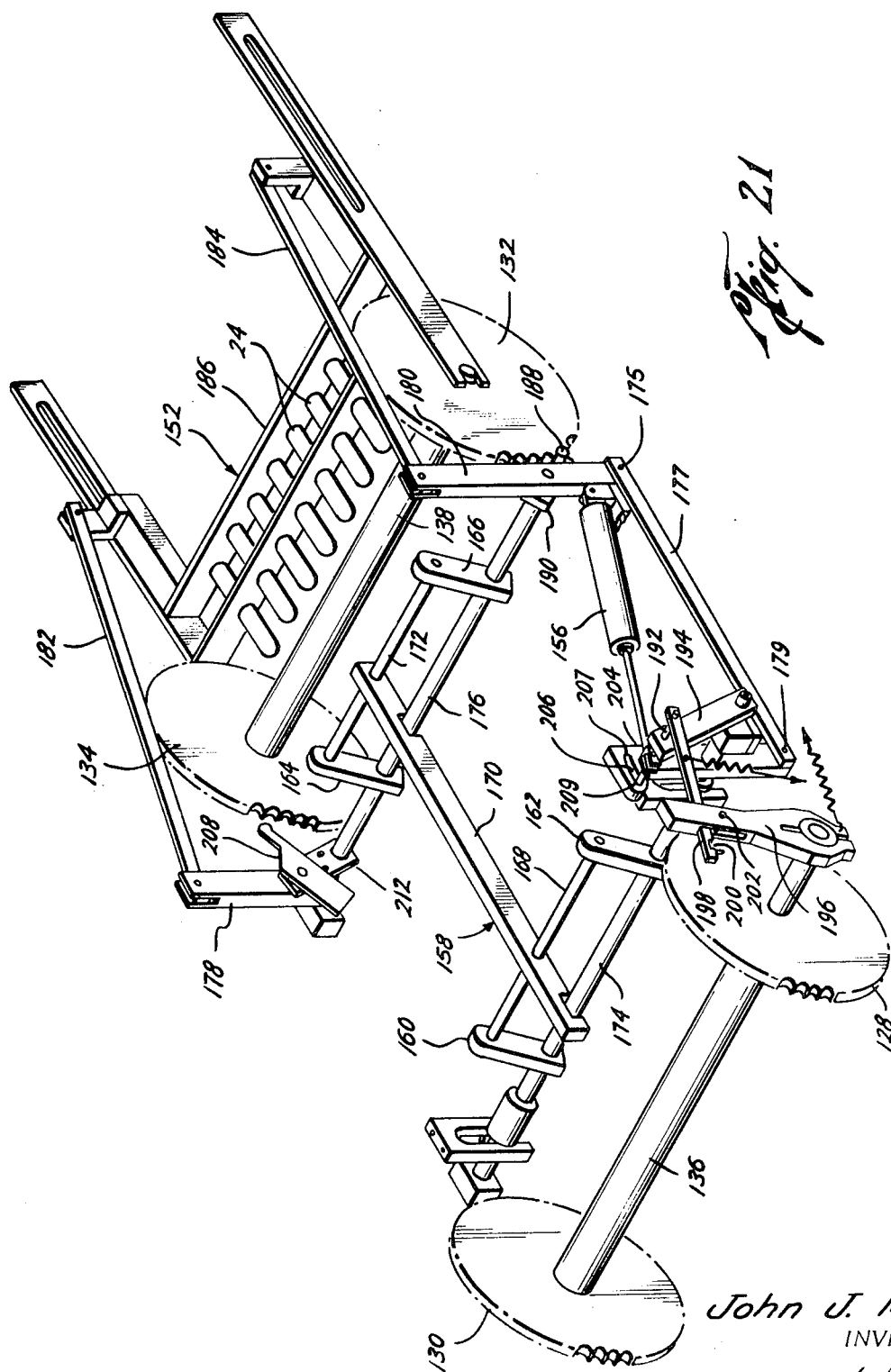
FIG. 21 is a perspective view of the actuating linkages actuating the endless conveyor, the heating baths and the tube drying means of the present apparatus.
Figure 31:
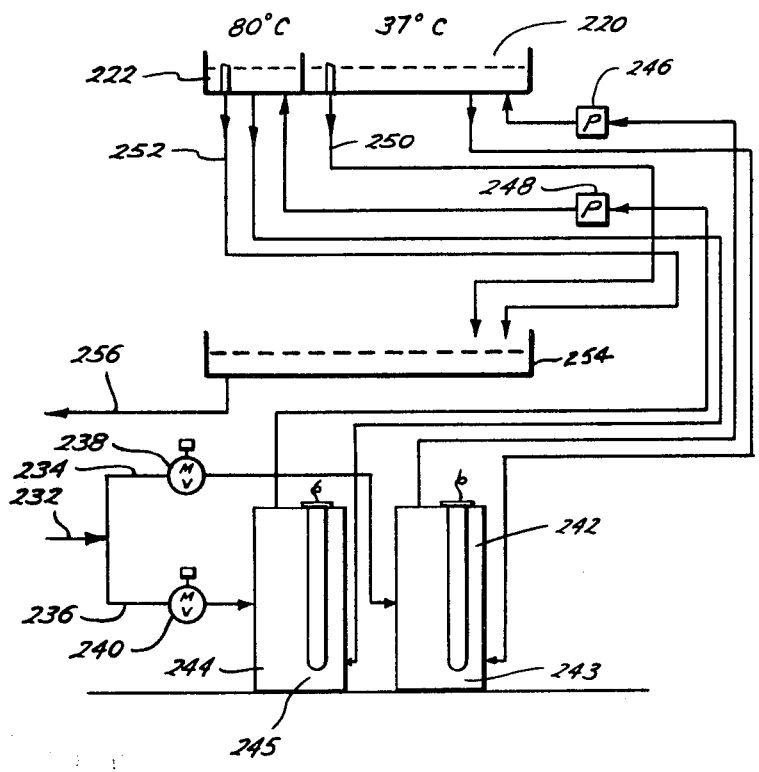
FIG. 31 is a diagrammatic view of the water connections to the water heating baths.

The longitudinal movement of the carriage car 64 along the carriage arm 66 is best seen from FIGS. 12, 13 and 16 in which a carriage meter 72 drives a pulley 74 through a reversing clutch 76 which in turn extends, retracts and controls the position of the car 64 along the arm 66 through a control cable 78 which passes around idler pulleys 81, 83, 85, 87 and 89 and is secured to block 91 on the car 64 whereby the position of the car 64 along the arm 66 may be controlled by connecting, disconnecting and reversing the clutch 76.

An overall view of the pick up and dispensing apparatus 34 is best seen in FIG. 14 which includes a waste and wash cup 80 (FIGS. 9, 11, 7, 14 and 16) in which the cup 80 has an outlet 82 for disposal of excess sample fluid and a wash cup 84 is provided with a cleaning media or water wash inlet 86 for admission of a cleaning media such as water which overflows the wash cup 84 into the waste cup 80 and out the outlet 82. As best seen in FIGS. 7 and 9 the waste and wash cup 80 is positioned in line with a transverse row 28 of tubes at the inner end of the arm 66. Since a single sample which is to be picked up from the indexing table 32 is to be dispensed into the tubes 24 in a single transverse row in accordance with the tests programmed, after which any excess sample 32 is dispersed and a new sample is too be picked up from the table 32 and dispersed into a different transverse row 28 of tubes, it is important that there be no undesired contamination or mixing from one sample to another sample, and additionally it is desirable that the dispersement of a single sample into the various tubes in a transverse row be under the same conditions to avoid variations in the samples dispensed in the various tubes, such as by example might be caused by dilution. Thus it is preferred, as best seen in FIG. 10, to provide a line 88 connected to the pick up and dispensing conduit or needle 62 which forms a portion of the pick up and dispensing apparatus 34 and is generally a closed water system such as water 90 followed by an air interface 92, a second interface 94 comprising a portion of the sample to be tested, a second air interface 96 followed by an extra sample aliquot and then the main sample 98 to be dispensed. By way of example only, assuming that each of the tests to be performed requires a sample amount of .1 cc., the sample 94 may be .1 cc. and the main sample 98 may have a volume equal to the number of tests to be programmed times .1 cc. plus an additional .2 cc. amounts. Thus, while the air interfaces 92 and 96 serve the function of preventing mixing between the water 90 and the main sample 98, the additional sample 94 and the extra sample aliquot picked up from the indexing table 32 prior to dispensing the samples into the tubes 24 will wash the interior of the line 88 with the same type of material to be dispensed, thereby reducing any tendency of the previously washed tube 88 to have, for example, a dilution effect on the main sample 98.

In order to provide the desired pick up of the sample to be tested and dispensed in the tubes 24, the pick up and dispensing apparatus 34, as best seen in FIG. 14, includes a sample pick up and dispensing cylinder and piston 100, a water wash piston and cylinder assembly 102, a needle raising and lowering air position and cylinder assembly 104, and an air piston and cylinder assembly 106 for creating air interfaces in the line 88.

As shown in FIG. 14 the needle 62 is in the down position, having been actuated to the down position by piston and cylinder assembly 104. When the needle 62 is lowered, the water wash piston and cylinder 102 is actuated back and forth by wash motor 108 through a rotating arm 110 to suck water into the needle 62 and line 88 and expel it therefrom, thereby cleaning the line 88 and needle 62 as fresh water flows through the water inlet 86 into the wash cup 84 and out the drain outlet 32. After the needle 62 and line 88 are washed, the wash motor 108 is stopped, the piston and cylinder assembly 104 is actuated to raise the needle 62 and the pick up and dispensing apparatus 34 is then ready to move into sample pick-up position over the indexing table 32. When the pick-up position is reached (FIGS. 7 and 13) the piston and cylinder assembly 104 is actuated to cause the needle to move downwardly, carrying and moving the piston 107 in cylinder 106 therewith causing an air interface 92 (FIG. 10) to be sucked in the line 88 and into the sample container 46 which has been indexed at the pick-up position by the table 32. Assembly 100 aspirates a sample 94 into line 88 by the rotation of worm gear 116 by the motor 112 which moves the cylinder 118 relative to piston 117. Piston and cylinder 104 is again actuated to raise needle 62. Assembly 100 and assembly 104 is actuated to lower needle 62 to aspirate another air interface 96 into the line 88. The aspiration and dispensing motor 112 operating through reversing clutch 114 rotates worm gear 116 and thus the cylinder 118 of the aspiration and dispensing piston and cylinder assembly 100 to aspirate the programmed amount of test sample 98 into the needle 62 and the line 88. When the programmed amount of sample is picked up from a sample container 46, the motor 112 stops, the piston assembly 104 is actuated to raise the needle 62, the motor 112 is reversed, thereby reversing worm gear 116 to retract the cylinder 118 to dispense a segment of the sample 98 back into sample cup 46 to insure that the status for dispensing of the sample into the tubes 24 will all be similar. The carriage arm 66 is moved back over the transverse row 28 of reaction tubes 24 and the control system actuates the carriage car 64 to place the needle 62 over the first reaction tube 24 which has been programmed for testing. The reversing clutch 114 is actuated and a measured amount of sample is dispensed into a reaction tube 24. The reversing clutch 114 is deactuated, the carriage 64 is then moved along to the next tube 24 in the transverse row which has been programmed for a test, the reversing clutch 114 is again actuated and a measured amount of sample is dispensed in that reaction tube 24. The process of dispensing measured amount of sample fluid into each of the reaction tubes 24 in a transverse row is continued until all of the programmed tests have received a sample. After the last programmed test receives a sample, the carriage 64 moves to the waste cup 30 and the extra sample aliquot is dispensed into the waste cup 80, the needle 62 is lowered and the wash cycle is again performed.

Referring now to FIG. 16, the sequence of operation and control of the pick up and dispensing apparatus 34 is best seen. Information is received in a sample selection control 115 from the control system, which will be more fully discussed hereinafter, as to which tests will be performed and therefore into which longitudinal rows 26 of tubes 24 the sample to be tested will be dispensed. Upon signals from the sample selection control 115, air valve 71 is actuated to in turn actuate air piston and cylinder 68 to swing the carriage arm 66 towards the sample table 32 and at the same time a signal is sent to the carriage control 119 and aspiration timer 121 and the carriage motor 72 is actuated through its clutch 76 and pulley 74 to move the carriage car 64 towards the sample table 32. The carriage motor clutch 76 reverses and stops over the pick-up position on the table 32 and air valve 120 is actuated and in turn actuates the piston and cylinder assembly 104 to lower the needle into the sample container 46 on the table 32. After the air interface 92, sample 94 and air interface 96 has been obtained, the aspiration and dispensing motor 112 is actuated and picks up the programmed amount of sample, the dispenser motor 112 is then reversed, air valve 120 is de-energized allowing cylinder assembly 104 to raise the needle 62. One segment of the sample is dispensed back into the sample cup and the arm 66 is moved back over the reaction tubes 24. The aspiration timer 121 starts the dispensing timer 123 when the carriage 64 stops over a programmed reaction tube 24. Dispenser clutch 114 is actuated and a measured sample is dispensed in the proper tube 24. The carriage clutch 76 is actuated and the carriage 64 moves to the next programmed test tube where another sample is dispensed. The dispensing process continues until all of the programmed tests have received a sample. The carriage 64 then moves to the waste and wash cup 80. At this time the wash control 108 starts and the needle 62 and line 88 are washed and filled with fresh water in preparation for the next cycle.

Referring now to FIGS. 17–28, the construction, operation and function of a preferred form of the loop conveyor or endless belt 22 is best seen. Preferably, the conveyor 22 comprises a plurality of individual rigid slats 122, each of which hold a transverse row 28 of reaction tubes 24, the slats 122 being secured at each end to a chain 124 by screws 126 (FIG. 27), and the chains are in turn carried by sprocket wheels 128, 130, 132 and 134 which are carried on axles 136 and 138 respectively. The rigid slats 122 are advantageous in that while allowing the conveyor to rotate around the wheels, they securely hold the tubes in fixed positions.

Referring now to FIG. 28, the method of inserting and accurately aligning the tubes 24 in the individual slats 122 before the slats 122 are connected to the chains 124 is best seen. The slats 122 have a plurality of openings 140 sized to receive the tubes 24 and are placed on a holder 142 having a base 144 and the tubes 24 are inserted in the holes 140. Holes 146 are drilled in the slats 122 extending to the openings 140. A holding pin 148 is threaded into the holes 146 against a resilient protector 150 which protects the tubes 24 from being broken as the pin 148 is secured. Thus, the tubes 24 are all held in the identical vertical positions relative to the slats 122 and are securely fastened to prevent them from later slipping relative to the slots 122 and becoming misaligned.

The conveyor 22 is periodically indexed a predetermined distance, such as one transverse tube row, to move the tubes 24 from one position or station to the next so that the appropriate chemical steps may be performed upon the programmed samples at the proper station, time and sequence. Therefore, suitable means are provided for periodically indexing the conveyor 22 a predetermined distance. However, since some of the other functions to be performed on the tubes 24 require a close coaction with the tubes, these functions may require synchronization with the movement of the conveyor 22. For instance, during the chemical testing process being performed in the tubes 24 heat may be required, and the preferred embodiment provides heating means 42 which may include one or more heating baths or heaters to satisfy the heating requirements of the chemical analysis. In addition suitable drying means 152 is provided which may include a plurality of individual electric heaters 154 connected to drying heater mount 186 for insertion into the tubes 24 for drying them after they have been washed. Since these components during their functional operation coact with the tubes 24 in such a way as to prevent indexing of the conveyor 22, these components are synchronized with the conveyor movement 22 for allowing movement of the tubes 24 from station to station.

Thus, referring to FIGS. 17–26, a power air and piston assembly 156 is provided to supply the power for retracting the tube heating means 42 and the tube drying means 152, indexing the conveyor 22 a predetermined amount, and again extending the tube heating means 42 and the tube drying means 152 into their functional position. Referring to FIGS. 20–23, a heating bath supporting structure 158 is provided which generally includes supports 160, 162, 164 and 166 connected by linkages 168, 170 and 172 and supported on shafts 174 and 176.

Drying means actuating linkages 178, 180 are connected to linkages 182 and 184 respectively which are in turn connected to the drying heater mount 186. The linkages 178 and 180 are connected by pin 175 to linkage 177 which extends and retracts the drying heating mount 186. Linkage 177 is connected by pin 179 to and actuated by lost motion actuating lever 204.

A stop lug 188 is connected to an arm 190 which is connected to the shaft 176 so that the stop 188 may release sprocket wheel 132 to allow movement of the conveyor 22 and may again re-engage the sprocket wheel 132 to hold conveyor 22 locked in position after the conveyor has been indexed.

A drive pin 192 is connected to the power air and piston assembly 156 for delivering the power from assembly 156. An arm 194 provides support for the pin 192. A power lever 196 is connected to the axle 136 connecting the sprocket wheels 128 and 130 to provide the forwarding indexing movement of the conveyor 22 as the lever 196 is moved counterclockwise. A lost motion arm 198 is provided connected between the drive rod 192 and the power lever 196 and includes a notch 200 which when retracted will engage a pin 202 on the lever 196 so that on the power stroke the lever 196 will move counterclockwise thereby indexing the conveyor 22. However, before the conveyor 22 may be indexed in the preferred embodiment, the heating baths and the dryer heater mount 186 must be retracted away from tubes 24 so as not to interfere with their movement. A lost motion lever 204 having a lost motion slot 206 therein is connected to shaft 174 and receives the drive rod 192 in the slot 206. Thus the lever 204 will not move with the drive rod 192 until the drive rod 192 engages one end or the other of the lost motion slot 206. However, the lost motion of slot 206 is less than the lost motion of arm 198 so that on the retraction stroke assembly 156 the rod 192 engages the back end 207 of slot 206 retracting arm 204 and rotating shaft 174 and also retracting arm 177. Rotation of shaft 174 in a clockwise direction lowers the heating bath supports 160–166 and thus the heater baths are moved out of engagement with tubes 24. Retraction of arm 177 moves linkages 178–184 and retracts the drying heater mount 186 away from tubes 24.

On the power stroke of assembly 156, the rod 192 and lever 198 move lever 196, thereby indexing the belt 22. However, the drive rod 192 is allowed to move in the lost motion slot 206 so that the heating bath supports 160–166 and the individual heater drying elements 154 will not be moved into the proximity of the tubes 24 until after the conveyor has been indexed, after which time the drive rod 192 will engage the front end 209 of the lost motion slot 206 to move the actuating lever 204 counterclockwise rotating the shaft 174, thereby raising the heater bath supports 160–166 and pushing linkage 177, thereby extending the individual drying heaters 154 into a row of tubes 24.

While, of course, the power stroke movement of the piston and cylinder assembly 156 through the rod 192, the arm 198 and acting through power lever 196 may be utilized for controlling the limit of travel of the conveyor 22, a more positive engaging pawl 208 may be rotatably supported on shaft 176 and arranged to engage the teeth on sprocket wheel 134.

Pawl 208 is rotatable about a pin 210 on arm 212 which is in turn fixedly secured to shaft 176. In the waiting position (first position) the pawl 208 is kept out of engagement with the teeth of sprocket wheel 134 by spring 214 between the pawl 208 and the arm 212 causing the pawl 208 to engage a stop pin 216 positioned on linkage 212. However, when the power cylinder 156 retracts thereby lowering the heating baths and retracting the drying heaters, shaft 176 is rotated bringing the end of the pawl 208 into engagement with the sprocket teeth of wheel 134 (FIG. 24). Further rotation of the shaft 176 causes the end of the pawl to become fully engaged with the sprocket teeth (FIG. 25, third position). As the power cylinder 156 moves on the power stroke and indexes the belt 22, the sprocket 134 will rotate the pawl to the fifth position as best seen in FIG. 25 at which time the pawl 208 will engage a stop pin 215 on the arm 212 thereby preventing further rotation of the sprocket wheel 134 and the conveyor 22.

Referring now to FIG. 23, stoppage of the rotation of the sprocket wheels and the conveyor 22 by the pawl lock 208 causes the lost motion arm 198 to become released from power lever 196 as the notch 200 by virtue of its rounded back edge 201 will move off of the pin 202 and return to the first position (FIG. 22).

After the conveyor 22 is stopped and thus indexed in a new position, further movement of the power stroke of the power assembly 156 causes the drive rod 192 which is by then moved through the lost motion slot 206 to engage the end 209 of the slot 206 and move lost motion lever 204 to rotate shaft 174 causing the heating bath supports 160–166 to move upwardly, moving the heating baths into engagement with the tubes 24 which are in the newly indexed position. Movement of lever 204 simultaneously moves arm 177 and linkages 178 and 180 which in turn move linkages 182 and 184 to move the drying heater block towards the new row of tubes 24 in the drying position whereby the individual heaters 154 are inserted into the tubes to perform the drying function. Rotation of shaft 176 also rotates arm 190 and stop pin 188 into engagement with the sprockets on wheel 132 thus holding the conveyor 22 in a locked position. Also, rotation of shaft 176 in moving linkage 178, as best seen in FIG. 25, moves the locking pawl 208 out of position five and into position six or its original waiting position one (FIG. 24).

While the form of the heating means 42 for heating the reaction tubes 24 to the temperatures necessary for performing the chemical analysis will of course depend upon the chemical tests performed, one form is shown in FIGS. 29, 30, 31, 33 and 34 for satisfying the heating requirements of the tests listed as programmed in FIG. 4. Thus a heater tray 217 is provided for supporting a P.B.I. electric heater 218 for providing a temperature of about 230° C. at stations 4–8 in the longitudinal row in which the P.B.I. test is performed (FIG. 4), a water bath 220 is provided for a temperature environment of 37° C., and a water bath 222 is provided for creating a temperature environment of 80° C. The heater tray 217 is supported by the heating bath supporting structure 158 (FIG. 21) which are slidably engaged on shafts 174 and 176 by slidable guides 224 and 226, and are engaged and are raised and lowered on supports 160–164 as previously indicated.

Figure 33:
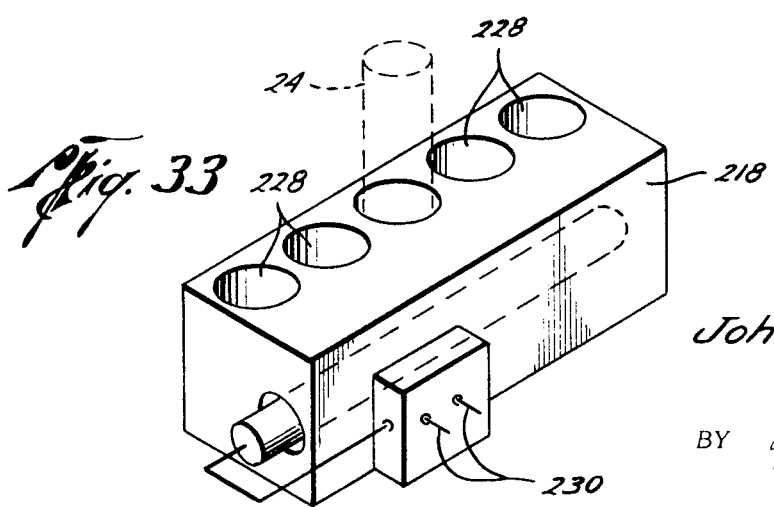
FIG. 33 is a perspective view of the electrical tube heating assembly of the apparatus.
Figure 43:
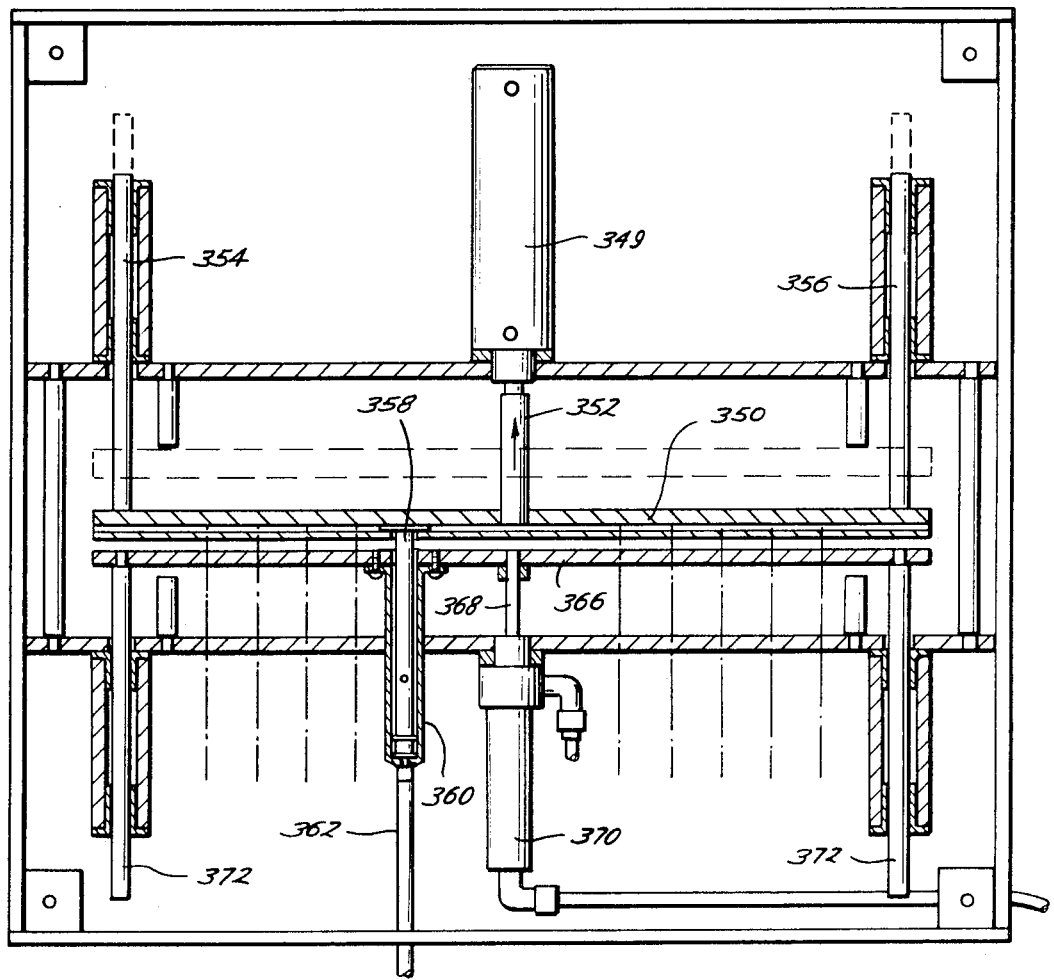
FIG. 43 is a view taken along the line 43—43 of FIG. 41 shown in position for aspirating the contents of the tubes into the cuvettes.

Referring now to FIG. 33, the P.B.I. heater 218 may be an electric heater having a plurality of openings 228 for enclosing the reaction tubes 24 when the heater 218 is raised and includes suitable electrical connections 230 for supplying the necessary electrical power for heating.

Water in baths 220 and 222 is circulated by means of pumps 246 and 248 respectively through suitable heaters 242 and 244 located in tanks 243 and 245 respectively. By suitable means of heater control the temperature in the baths 220 and 222 is controlled. Water to baths 220 and 222 is provided through line 232, branch lines 234 and 236 and controlled by valves 238 and 240 respectively. Excess water in baths 220 and 222 flows into overflows 250 and 252 respectively and drains into sump 254 which has an outlet 256 through which drain water is disposed.

Figure 32:
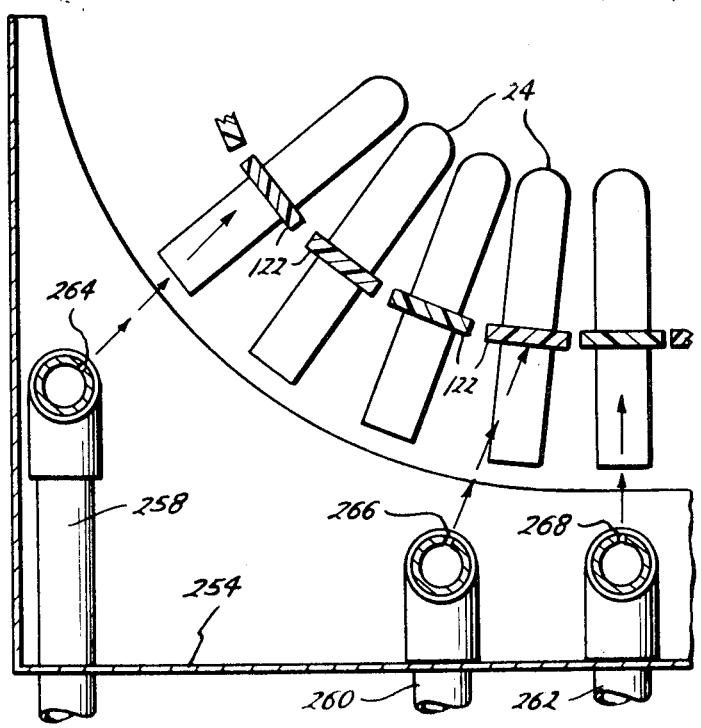
FIG. 32 is an enlarged elevational view, taken in cross section, of a portion of the conveyor illustrating the tube and slat wash assemblies.

Referring to FIG. 5, it has been previously indicated that as the conveyor is indexed, and after the conclusion of the chemical analysis, the tubes 24 are inverted, thereby draining the contents therefrom, and are then washed in preparation for recycling. Referring now to FIG. 32, wash pipes 258, 260 and 262 are provided having spray nozzles 264, 266 and 268, respectively for directing a spray of cleaning water at various stations into the tubes 24 and onto the slats 122 for washing and cleaning the tubes and conveyor. The contents of the tubes 24 and the spray water are received in a drain sump 254 for disposal.

Figure 34:
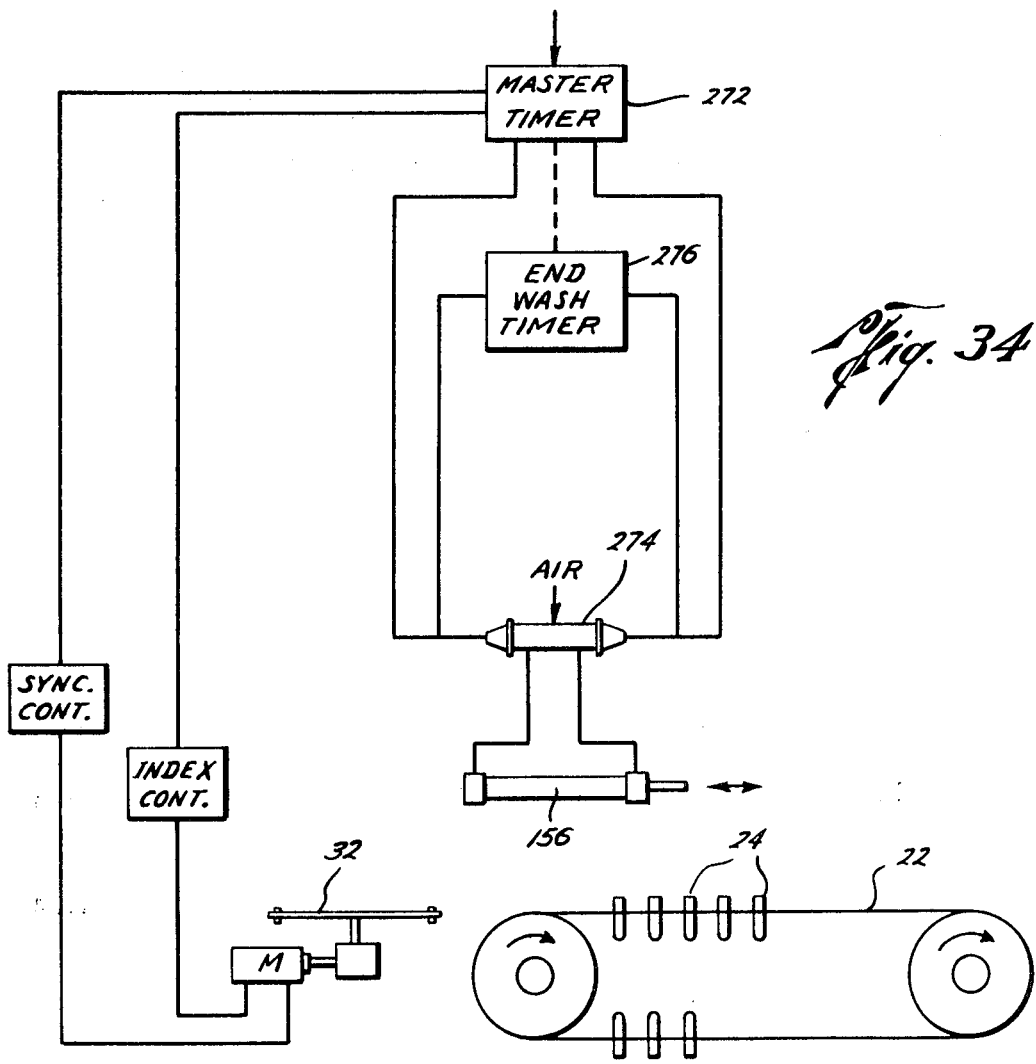
FIG. 34 is a schematic view of the control system of the end wash assembly.

Referring now to FIG. 34, a master timer 272 is provided as part of the control circuit which will be more fully described hereinafter, which after the tests have been programmed controls the rotary indexing table 32 as well as controlling air valve 274 which in turn controls the power air piston assembly 156 which drives the conveyor 22. After the last programmed test is completed the master timer 272 is deactuated and at that time actuates the end wash timer 276 which will continue to index and actuate the power assembly 156 to index the conveyor 22 for a predetermined number of cycles to insure that all of the tubes 24 are washed and cleaned.

Referring now to FIGS. 35–39, the reagent dispensing assembly 36 is best seen in which the various reagents required for the various chemical tests are provided in reagent containers 38 and are drawn therefrom by metered dispensing units 40 and dispensed into the reaction tubes 24 at the proper positions or stations and in the proper amounts for performing the desired programmed tests. Preferably, the metered dispensing units 40 include a glass cylinder 278, a Teflon piston 280 therein for drawing in a metered amount of reagent from the connected container 38 through a first check valve 282 and dispensing the metered amount of reagent through a second check valve 284 to a tube 24. It is desirable that the components of the reagent dispensing assembly 36 be of glass, Teflon or other inert material which will withstand and hold up in extended use with the chemical reagents used. The check valve 282 is connected through a fluid passageway 286 to one of the reagent containers 38 and generally includes a compartment 288 or chamber having a ground and polished glass valve seat 290 in communication with the passageway 286 and a glass valve element 292 preferably in the form of a cylindrical element, which element 292 includes a ground flat surface 291 for seating on the seat 290. A second fluid passageway 294 leads from the compartment 288 into the interior of the cylinder 278 for drawing reagent from a container 38 into the cylinder 278 on the suction stroke of the piston 280. A bypass notch or passageway 296 is provided at the outlet edge of compartment 288 having a length longer than the width of element 292 to insure that passageway 294 remains open on the suction stroke of the piston 280 so that the reagent may be drawn through passage 286, through compartment 288, and into passageway 294 and the cylinder 278. However, when the piston 280 is on the dispensing stroke, valve element 292 is forced into contact with the polished glass seat 290 providing a positive seal for sealing off any return of the reagent back through passageway 286 to container 38 and instead forces it out of a passageway 298 and through the check valve 284 to a reaction tube 24. The structure of check valve 284 is similar to that of check valve 282. Thus on the suction stroke of the piston 280, a metered amount of fluid flows through the first check valve 282 while the second check valve 284 is closed. On the dispensing stroke of the piston 280 the first check valve 282 is closed and the second check valve 284 opens allowing fluid to be dispensed through fluid passageway 298 to a reaction tube 24.

The Teflon piston 280 includes first and second flanges 300 and 302, which maintain a seal with the glass cylinder 278. Collar 303 serves to align piston 280 and the piston rod 304 in the cylinder 278. As best seen in FIG. 37 a T slot 306 is provided in the end of piston rod 304 for connection to an actuating assembly and is adapted to engage a T head 308 (FIG. 36). The T slot 306 thus provides a loose fitting connection with the T head 308 in a transverse direction so that in the event the T head 308 is not accurately aligned with the piston rod 304 there will be sufficient transverse play in the connection so that the piston 280 will remain axially aligned in the cylinder 278 and not bind in the cylinder 278 or break the glass cylinder 278 because of misalignment as the piston is reciprocated therein.

Referring now to FIG. 36, the power source for reciprocating the piston 280 in the cylinder 278 for dispensing the reagent may be an air piston and cylinder assembly 310 in which an air inlet 312 directs air to one side of a piston 314 to move stem 316 and thus the T head 308 connected to the piston rod 304. A spring 318 is provided acting between a stop 320 and piston 314 for moving the piston 314 in a suction direction. An orifice outlet 322 is provided to limit the rate of outlet air on the suction stroke in order to limit the rate of suction speed for the meter dispensing unit 40 in order not to have an adverse effect on the reagent or damage the unit. An electrical operated valve 324 is provided for actuation of the dispensing unit 40 by admission of air to the lower side of piston 314. The distance that the stem 316 and thus the piston 280 (FIG. 37) moves on the dispensing stroke can be adjusted by a sleeve 328 which is locked in adjusted position by a nut 330 to limit the amount of fluid drawn into and dispensed from the cylinder 278. Thus, by suitably adjusting the sleeve 328 the stroke of the piston 280 and thus the amount of metered reagent may be accurately controlled.

Referring now to FIG. 35, an outlet line 332 is connected to each of the reagent metered dispensing units 40 for receiving the metered amount of reagent and dispensing it into a reaction tube 24. Referring to FIGS. 38 and 39, dispensing line holding bar 334 is supported by adjustable support 336 for positioning of the bar 334 over a transverse line 28 of reaction tubes 24. The bar 334 includes a plurality of openings 338, each of which is directed into the top of a reaction tube 24 positioned thereunder, for supporting the outlet end of dispensing line 332. As best seen in FIG. 39 it is preferred that the openings 338 be at an angle to the longitudinal axis of the tubes 24 so that the incoming reagent will be directed into a tube 24 at an angle thereto adjacent the top of the curved bottom of the tube 24 to create a swirling action as the reagent is dispensed therein to provide sufficient agitation and swirling of the mixture to thoroughly mix the reagent with the sample therein thereby eliminating the requirement of additional shaking or stirring of the mixture to secure the desired chemical reaction. Of course, a plurality of the support bars 334 are provided along the top of the transverse rows of the reaction tubes 24 depending upon the number and stations at which the reagents are to be dispensed which depends upon the chemical tests being performed by the apparatus.

As indicated in FIGS. 4 and 5, after the sample has been dispensed into the tubes 24, the reagents added at the proper stations during the test and properly heated, the tubes are indexed to a readout station in which the results of the test are analyzed such as by a readout assembly 44 such as an optical readout. Referring now to FIGS. 40–55, the readout assembly 44 is best seen, and in particular FIGS. 40–42 in which a plurality of cuvettes 340, preferably optically matched, are provided, one each for each of the longitudinal rows 26, which are positioned over the reaction tubes 24 at the readout station and which are transversely aligned and supported by a movable support or readout block 342 which is in turn supported by guides 344 at each end which is connected to a piston rod 346 (FIGS. 40 and 42) which is connected to an air piston and cylinder assembly 348 for raising and lowering the readout block 342 for lowering the cuvettes 340 into the tubes 24 whereby the fluid in the tubes 24 may be aspirated into the cuvettes, optically analyzed and drained again into the tubes 24 after which the piston and cylinder assembly 348 raises the readout support block 342 out of the tubes 24 so that the conveyor 22 may be indexed and another set of tubes 24 brought to the readout station and analyzed.

After the air piston and cylinder assembly 348 lowers the readout block or support 342 downwardly and the lower end of the cuvettes 340 which preferably includes an elongated passageway 341 are inserted into the tubes 24 a fill and expel air piston and power assembly 349 (FIGS. 41, 43, 45 and 54) is actuated and is connected to a movable bar 350 by piston rod 352 which is supported at each end by slidable rods 354 and 356. The actuating bar 350 is connected to a plurality of individually arranged syringe pistons 358, one for each cuvette 340, which is slidable in a cylinder 360 with a line 362 connecting each cylinder 360 to one of the cuvettes 340. Thus on actuation of the fill and expel piston and cylinder assembly 349 on the suction stroke the actuating bars and all of the piston rods 352 are retracted drawing back all of the pistons 358 creating a suction in the lines 362 and in each of the cuvettes 340 to suck up the liquid from the tubes 24 into the cuvettes. A serpentine passageway 343 is provided between the passageway 341 and the body of the cuvettes 340 for slowing the flow of fluid into chamber and preventing aspirating the fluid into line 362.

Figure 44:
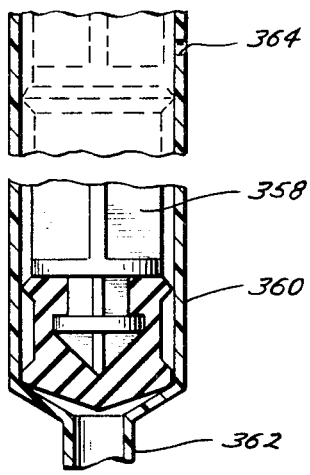
FIG. 44 is an enlarged fragmentary elevation view, in cross section, of the fill and expel cylinder and piston assembly.
Figure 47:
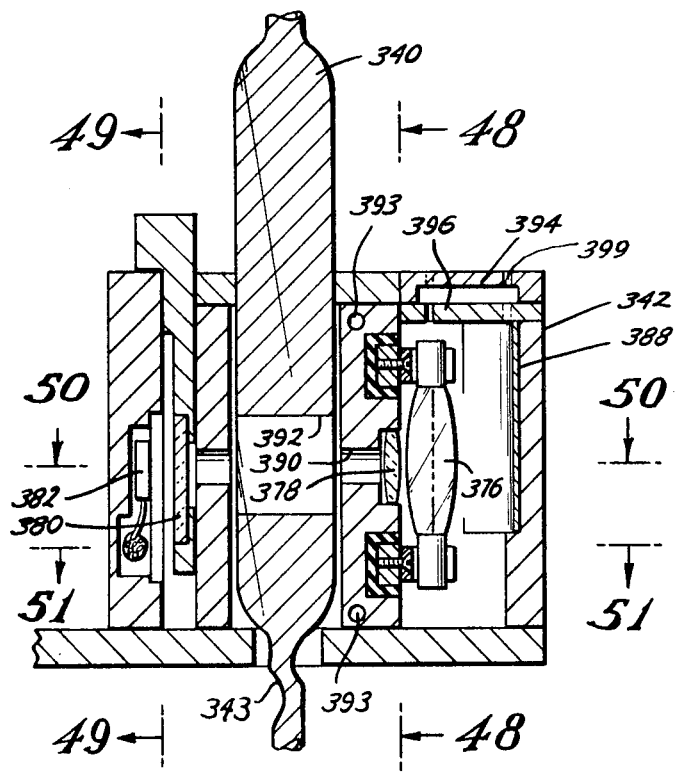
FIG. 47 is a view taken along the line 47—47 of FIG. 40.
Figure 48:
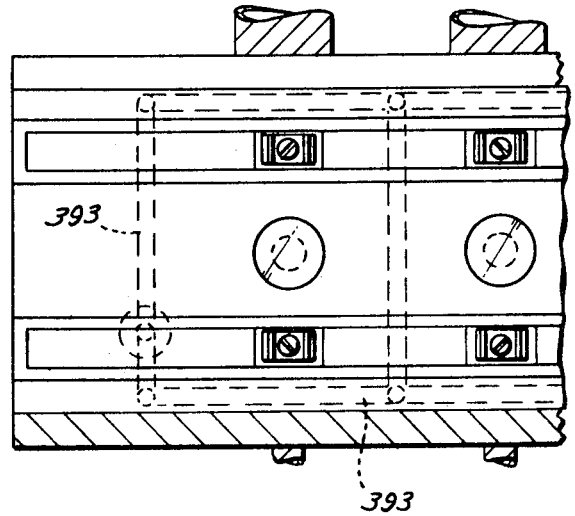
FIG. 48 is a view taken along the line 48—48 of FIG. 47.
Figure 49:
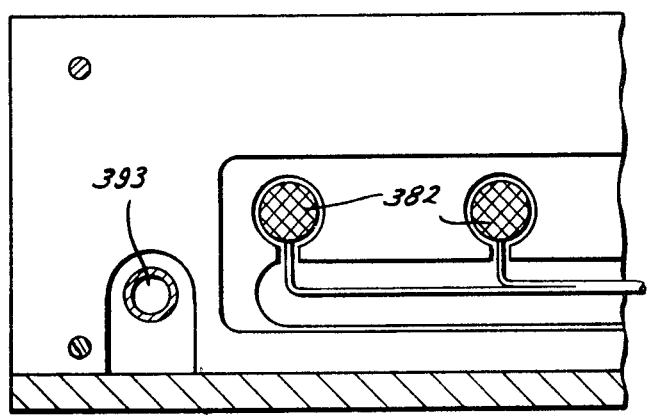
FIG. 49 is a view taken along the line 49—49 of FIG. 47.
Figure 50:
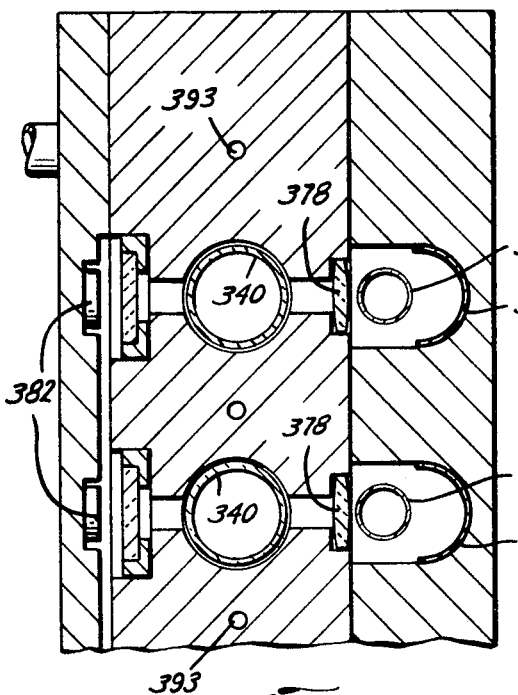
FIG. 50 is a view taken along the line 50—50 of FIG. 47.
Figure 51:
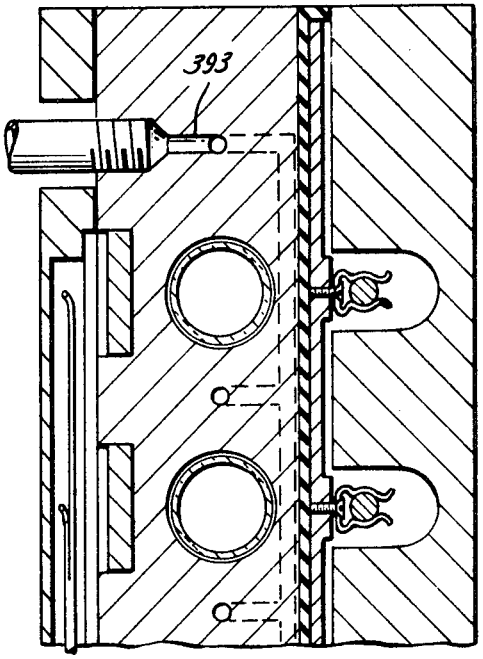
FIG. 51 is a view taken along the line 51—51 of FIG. 47.
Figure 52:
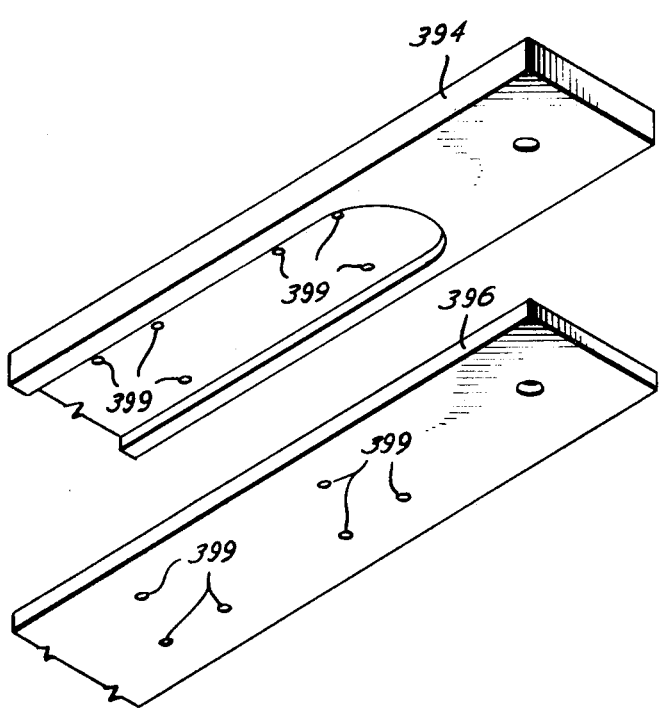
FIG. 52 is an exploded perspective view of the covers above the exciter lamp in the photocell readout block assembly.

Referring now to FIG. 44, it is noted that when the syringe piston 358 is retracted in the syringe cylinder 360 the piston seal is not moved past an air drain port 364 provided in the cylinder wall.

While all of the pistons 358 are connected to the actuating bar 350, all of the syringe cylinders 360 are connected to a drain bar 366, which is connected to a piston rod 368 which is in turn connected to a drain piston and cylinder assembly 370. The drain bar 366 is supported on movable support rods 372 for slidable movement thereon.

After the optical readout of the liquids in the cuvettes 340 is completed, the air piston and cylinder assembly is actuated to raise the readout block 342 from the reaction tubes 24 to its original position shown in FIGS. 40 and 41. It is then desired to drain the cuvettes 340 of the liquid therein, and the drain piston and air asesmbly 370 is actuated, as best seen in FIG. 45 thereby moving the drain bar 366 away from the syringe pistons 358 and thus moving the syringe cylinders 360 in such a manner to move the air port 364 past the piston 358. The air port 364 is moved, as best seen in FIG. 46, past the piston 358 to the dotted position thereby allowing air to enter the syringe cylinder 360 relieving the suction in the lines 362 and allowing the liquid in the cuvettes 340 to drain back into the reaction tubes 24.

In order to further drain the cuvettes 340 the fill and expel air piston and cylinder assembly 349 is actuated to move the actuating bar 350 and thus the pistons 358 back into the syringe cylinders 360 providing an air impulse through the lines 362 and the cuvettes 340 as the piston 358 passes the air port 364 to assist in further draining the readout tubes 340. In addition, a further air blast may be provided to further drain the cuvettes as the drain piston and air assembly 370 is actuated to return the drain bar 366 to its original position thereby causing the syringe cylinders 360 to move towards the syringe piston 358 creating an additional air blast.

As best seen in FIG. 54 a readout timer 374 is provided connected to air valves 375, 377 and 379, respectively for suitably actuating and reversing the air piston and cylinder assemblies 348, 349, and the drain assembly 370 to sequentially lower the cuvettes 340 into the reaction tubes 24, to aspirate the sample into the cuvettes 340 and after the readout has been accomplished, to raise the readout cuvettes 340, drain the fluid therefrom, and expel the remainder of the fluid therein by air blasts so that the readout assembly is in condition for the next cycle.

As previously mentioned, it is preferable to perform the readout tests optically and such a system is shown schematically in FIG. 55 wherein a light source such as an exciter lamp 376 is provided to direrct light through a lens 378, through the sample in a cuvette 340, through a filter 380, and to a light measuring means such as photovoltaic cell 382, wherein the value of light intensity measured by the photoelectric cell 382 which is a measure of the property being tested, is transmitted through electrical calibration control circuit 384 to a readout device such as a recorder 386. The physical structure of the readout block 342 is best seen in FIGS. 47–52 wherein the exciter lamp 376 provides a light source through the lens 378 which is preferably phosphate glass which performs the function of not only collimating or directing the rays of light from the lamps 376 into parallel rays but also absorbs heat to prevent the heat from the lamps from affecting the optical testing of the sample. Chrome reflectors 388 are also provided behind the exciter lamp 376 to direct the light through the lenses 378 and through a window 390 through the readout cuvette 340 which preferably includes a window 392 with the remainder of the cuvette being amber colored to cut out stray light. After the light passes through the sample in the cuvettes 340 it passes through the filter 380 which filters out undesired light and allows only the spectrum of light being measured to pass through to the photocell. It is preferable that the filter 380 be positioned between the cuvette 340 and the photocell 382 in order to prevent the heat from the lamp 376 from adversely affecting the filter 380.

However, as previously mentioned, it is further desirable to control the heat environment in which the readout tests are performed and as the exciter lamps 376 radiate a great amount of heat, the readout block 342, as indicated in FIGS. 47, 48, 49, 50 and 51 include water passageways 383 so that water may be passed therethrough for cooling the block 342. In addition, in order to provide additional cooling for the exciter lamps 376, the readout block 342 may include air partitions 394 and 396 (FIGS. 47 and 52), each of which includes a plurality of air vents 399 for allowing the heat to escape from the lamp 376. However, the vents 399 on the member 394 are out of vertical alignment with the vents 399, thus allowing heat to escape, but reducing the admissibility of stray light into the lamp compartment.

Referring now to FIG. 53, an electrical schematic of the readout system which includes portions of the control systems of FIGS. 54 and 55 is best seen. As will be more fully described in detail, a push button program panel 398 is provided in which the various tests desired to be performed by the apparatus are programmed, with the information being transmitted to a computer 400. An actuating operate button 402 is depressed to actuate and start the master timer 272 controlling the various functions in synchronism. At the proper point in the operating cycle the readout timer 374 (FIG. 54) actuates the readout block air cylinders 348 to place the cuvettes 340 into the reaction tubes 24. The test samples are then aspirated into the readout tubes 340 by the air piston assembly 349. During the readout cycle each of the exciter lamps 376 directs a light beam through a cuvette 340 to a photocell 382 for each longitudinal row of tubes 24. Each exciter lamp 376 has a lamp failure relay 404 which is connected to an alarm system 406 to provide an audible sound in the event that one of the exciter lamps 276 fails.

The recorder timer switch 410 is then actuated to begin its sequential scan through each of the tests programmed by the apparatus by sequentially connecting the output of each photocell to the recording pen on the recorder 386, the output signal is clamped, the chart paper advances registering the signal on the chart paper in such a manner as to indicate the concentration of the unknown in the solution undergoing the analysis. During the process of scanning, lamps 458 are illuminated indicating the test being registered, counters 459 pulsed sequentially counting each test being registered, and the re-setting of the programmed relays 461. Just prior to the completion of the scanning cycle, a pulse is sent to the readout timer 374 to enable it to complete its final phase of the readout cycle, suitably actuating the controls in FIG. 54 to drain the tested sample from the cuvettes 340 and retract them from the tubes 24 in preparation for the next cycle.

In addition, a plurality of electrical calibration control circuits 384, each connected to a photocell 382 are provided. As a part of each electrical control circuit 384, a "blank" potentiometer 385 and "reference" potentiometer 387 may be provided to control and calibrate the output from each photocell 382 in accordance with a known sample being tested. Used in conjunction with each other, these potentiometers 385 and 387 make it possible for the information transmitted to a readout device such as recorder 386 read directly in the desired measured units in spite of any individual differences in cuvettes, photocells, filters, etc.

Referring to FIGS. 14 and 15 a clutch 114 is connected to motor 112 to provide a two-way drive for the pick up and dispensing apparatus 34. Referring now to FIGS. 56–59, a more detailed description of the structure and operation of the clutch 114 may be best seen. The clutch 114 is for providing a two-way clutch between the drive shaft 422 and the driven shaft 420. In a conventional clutch the drive shaft 420 is connected in housing 421 to a cam member 424 having cam surfaces 426 thereon which are adapted to engage clutch bearings 428 and cause them to engage a driving member housing 430 which is connected to the driving shaft 422. However, this conventional clutch will only operate in a single rotation direction of the drive shaft 422 and the direction is determined by the direction the springs 432 are connected between the driven housing 421 and the cam member 424. A forward indexing pin 422 is provided on housing 421.

Added to the conventional clutch is a reversing pawl 434 which is spring loaded rotatably mounted on pin 440, housing 430 and yieldably urged against a stop pin 436, and a reverse pin 438.

When the driving shaft 422 is turned in a counterclockwise direction 423, the driven shaft 420 turns conventionally as the springs contract and engage the internal bearings 428 in the clutch until an external stop means such as a solenoid switch 444 having an actuating lever 446 which, when actuated into position, stops the driven shaft by engaging forward indexing pin 442 thus expanding the springs 432 and releasing the internal bearings 428. The drive shaft 422 continues to turn and the spring loaded pawl 434 springs past the reversing pin 438 and thus the driven shaft 420 is disconnected and will only turn when the forward indexing pin 442 is released by the solenoid switch 444 and lever 446.

Whenever the drive shaft 422 is driven in a clockwise direction 425, the driven shaft 420 begins to turn clockwise as soon as the pawl 434 engages reverse pin 438. Thus, the two-way clucth 114 may be simply actuated in either direction of rotation of the drive shaft.

Referring now to FIGS. 6 and 6A, the electrical power supply circuit and circuit breaker switch board are best seen. The circuit breaker board 445, also seen in FIG. 1, has various individual circuit breakers labeled as indicated with the corresponding numeral in the enclosed circle shown in position in FIG. 6. The circular enclosed figures are push button circuit breakers which pop out when an overload occurs, thereby causing an audible alarm whereby the operator may quickly check the control board to locate faults. Thus, a power input is provided at 447 and to a conventional magnetic contactor 448. Circuit 1 is the power supply to the various control circuits with branch circuit 2 being a 115 volt AC circuit, circuit 3 being a 48 volt DC supply circuit, circuit 4 being the power supply to the air compressor 450 (FIGS. 2 and 3) which provides the air supply for various machine functions, circuit 5 is to the various bath heaters 218, 242 and 244, circuit 6 is to the drying heaters 154, circuit 7 is to the computer 400, circuit 8 is to the endless belt or conveyor 22, circuit 9 is to the same dispensing assembly 30, circuit 10 is to the tube wash and wash valves, circuit 11 is to the drain timer and drain motor (now shown), circuit 12 is to the reagent dispensing solenoids 324, circuit 13 is to the readout 44 and photocells 382, circuit 14 is to the recorder 386, and circuit 15 is to the 12 volt DC power supply for lamp failure relays 404 and the exciter lamps 376.

The push button panel 398 (FIG. 1) is best seen in FIGS. 60–62, and includes a plurality of vertical rows 452 of indicating lights and buttons, each row corresponding to each transverse row 28 of tubes 24, and assuming that there are ten longitudinal rows 26 of sixty tubes, each vertical row 452 of push buttons will include ten buttons, one for each row which when pushed indicates that the test in that longitudinal row is programmed for a particular sample. In addition to the ten individual selected discretionary program buttons each row includes a button 454 labeled P indicating that a profile or the entire ten tests are to be run on that sample, and also includes a release button 456 for disengaging all of the buttons pushed in that particular row 452 in the event of error or in the event that it is desired to change the tests being programmed. In addition, station numbering lights 460 and indicating lights 458 for indicating the status of the tests on that particular vertical row 452 are provided. The push buttons on the panel 398 are connected to a fixed section or stationary board 462 of the computer 400. The panel 398, in the example shown, has sixty buttons in horizontal rows whereby sixty samples may be programmed for the various tests programmed into the apparatus.

The computer 400 is best seen in FIGS. 64–66 and includes a sweep section 464 connected to a worm gear drive 466 which is in turn connected to a sweep board clutch 468 driven by motor 470 for controlling the relative position of the movable section 464 to a fixed section 462. The sweep board motor 470 actuates and indexes the sweep board 464 in synchronism relative with the indexing of the belt 22 so that the information programmed on the programmer 398 is suitably transmitted to the proper function controls whereby the sweep board then transmits the information such as which tests are to be performed, which readout is to be actuated which also depends upon which test is to be performed, how much sample material the pick up and dispensing apparatus 34 is to pick up which also depends upon the number of tests to be performed on each sample, and dispenses the proper reagents which also depends upon which tests have been programmed. For example, the stationary board 462 corresponds to and is electrically connected to the panel 398. That is, board 462 will include ten rows of sixty terminals or pins 463 connected to corresponding buttons on panel 398. However, the sweep board 464 will require terminals 465 corresponding to the number of tube reaction stations on the conveyor, in the example given twenty, at which discretionary functions may be programmed and performed. Thus as the sweep board 464 indexes past the stationary board 462 its pins 465, which are preferably spring loaded as shown in FIG. 66, move against pins 463 and pick up the programmed information and transmit it to the various systems which perform the various steps in the chemical tests at the twenty work stations (FIG. 4). Since the sample being tested travels through twenty possible work stations on the belt 22 from sample delivery to sample readout, the sweep board 464 signals the various systems that a function is to be performed in a particular cycle. As previously indicated the information sent from the sweep board includes: whether further samples are programmed, in which longitudinal rows samples are to be dispensed, what reagents are to be added at a given station, operate indicator lights on the program board 398 to indicate which samples are in progress, which tests are to read out, and when the readout function is to be performed. Thus the computer 400 will repeat every machine cycle until it detects no further programming. At this time the sweep board 464 will return to the zero position, the master timer 272 will stop running and the apparatus will be placed under the control of the end wash timer 276 as discussed in connection with FIG. 34.

However, in addition to the sixty rows of contacts 463, the stationary board 462, because the apparatus 20 is a continuous cycling apparatus and because the boards are physically constructed linearly, the stationary board 462 will include an additional twenty rows of contacts 463 which are electrically jumpered to the first twenty rows of contacts on the stationary board 462 whereby the linear board may function as a rotary switch, although of course a rotary board may be used in place of boards 462 and 464, by picking up the information programmed on the first twenty rows of buttons 463 as the sweep board 464 passes the first contacts. During operation of the first position on sweep board, 464 will index from zero position to position eighty on the stationary board, then the sweep board reverse 416 will actuate to return the sweep board to position number twenty-one on the stationary board and will continue to index between position eighty and position twenty-one until programming ceases. Then sweep board 464 will return to zero position. The reagent selection board 113 is shown in FIG. 64 wherein jump cables are provided to actuate the various reagent solenoids 324 at the proper station on the belt. In addition, the sweep board transmits information to the readout timer for controlling the readout and recording functions. The reagent selection board 113 includes rows 127 of receptacles connected to the electrical solenoids 324, which for the tests being programmed on the apparatus in FIG. 2, requires sixteen reagents and solenoids thereby requiring sixteen receptacles in rows 127. In addition, since there are provided seventeen possible tube stations for each test at which reagents may be dispensed, the reagent selection board 113 includes seventeen rows 129 of ten receptacles which are connected to the reagent dispensing pins on the sweep board 464. Therefore, in order to set the apparatus up, various jump cables 125, all of which are not shown, are connected from the reagent solenoid receptacles in rows 127 to the proper reagent station receptacle in rows 129 so that when the particular station is reached by the sweep board 464, the proper reagent solenoid will be actuated to dispense that reagent into the proper reaction tube 24.

Referring again to FIG. 6, buttons 472, 474 and 402 are provided to start and stop apparatus 20. Button 472 is an off button for stopping the entire apparatus. Button 474 is a standby button which is actuated prior to starting the operate button 402. The standby button 474 when actuated actuates the magnetic contactor 448 which provides power to circuits 1–15 and makes apparatus ready for operation so that actuating the operate button 402 actuates the master timer 272 which starts the automatic chemical analysis.

Referring now to FIG. 63, an electrical block schematic diagram is shown of the functional controls of the present invention. As has previously been indicated the desired tests which are to be performed are programmed on the push button program board 398, thereby providing a discretionary control on what chemical tests are to be performed on each sample. Also, the samples have been sorted on the sample table 32 in the sample containers 46 and the standby button 474 (FIG. 6) is actuated to bring the various heating baths up to their proper temperature. Actuation of the operate button 402 (FIG. 6) actuates the master timer 272 which transmits a signal to the programmed board 398 and the computer which includes stationary board 462 and the movable sweep board 464.

From the sweep board 464 information is sent to the sample selection control 115 for storage. Selection control 115 transmits a signal to the carriage arm valve 70 and actuates the aspiration timer 118 through the carriage control 116. In addition, the sample selection control 115 transmits signals to the dispenser control 111, the dispenser timer 122, the aspiration timer 118 and the carriage control 116. A signal is sent from the carriage control 116 to the carriage clutch 76 to actuate the carriage and motor 72 (FIG. 16) to move the pick up and dispensing needle 62 over the pickup station on the sample table 32. As more fully described in connection with FIG. 16 the needle 62 moves into the cup 46 and aspirates the programmed amount of sample, the dispenser timer 123 reverses the dispenser clutch 114, the needle is raised, a segment of sample is dispensed back into the sample cup 46, the carriage arm 66 moves back over the row of reaction tubes 24 and the dispensing timer 123 stops at each of the programmed longitudinal rows 26 of tubes and dispenses a sample of serum.

In addition, the sweep board 464 transmits information to the reagent selection board 113 to actuate the reagent solenoid valves 324 to provide a measured amount of the correct reagent at the proper station in the cycle.

The sweep board 464, which receives the programmed information from the stationary board 462, actuates the readout timer 374, which controls the raising and lowering of the readout block 342, for aspirating the fill and expel assembly 349 therein and expelling it again after the conclusion of the readout tests. The readout timer 374 also controls the recorder timer 410 which in turn scans each of the programmed tests and records them on the recorder 386.

During each cycle the master timer 272 signals the conveyor belt 22 which is indexed, provides the signals for the transmission of programmed information to the function circuits and commencement of the functions, signals the deprogramming of the control buttons upon completion of each individually programmed sample, actuates the advance control 414 to advance the sweep board to the programmed signals for the next row of programmed tests, signals the tube wash assembly 277 to wash the drained tubes, and in addition, signals the sample table 32 which is indexed.

Of course, it is important that the belt 22, the sample rotary indexing table 32, and the sweep board 464 be synchronized in relative position at all times to insure that the correct sample on the sample indexing table is picked up and dispensed in the corresponding transverse row of tubes on the belt 22 and the operating functions are synchronized.

Thus, referring to FIG. 67, a synchronization switch 479 may be positioned to measure the indexed position of the belt 22 such as being driven by a belt drive 481 connected to one of the belt 22 sprockets. Thus, as the belt is indexed one tube row, the synchronization switch 479 is rotated to indicate the position of the belt 22. Similarly, another synchronization switch 480 (a double layer wafer switch) is positioned connected to the rotary table 32 to measure the rotational position of the table. And the synchronization switches 479 and 480 are connected in series through the computer 400 comprising the sweep board 464 to insure that the indexing table 32, the belt 22, and stationary board 462 and the sweep board 464 are in synchronization before proceeding with the next sequence of tests.

The present invention therefore is well adapted to carry out the objects and attain the ends and advantages mentioned as well as others inherent therein. While a presently preferred embodiment of the invention is given for the purpose of disclosure, numerous changes in the details of construction, and arrangement of parts will readily suggest themselves to those skilled in the art and which are encompassed within the spirit of the invention and the scope of the appended claims.

What is claimed is:

1. In a chemical testing apparatus in which a plurality of open top reaction tubes are indexed through various positions, test samples and reagents are dispensed into the tubes, and the contents of the tubes are heated and analyzed, the improvement in means for injecting the reagents into the tubes comprising,
   a plurality of chemical reagent containers,
   a plurality of outlet lines each connected to one of the containers and extending to a point above the tops of the tubes, and
   reagent dispensing means in the outlet lines for drawing a predetermined amount of reagent from said containers and dispensing the reagent into a tube, said reagent dispensing means including,
      a cylinder and piston, said cylinder and piston being of an inert material,
      two one-way glass check valves connected to said cylinder, one connected to admit reagent to the cylinder and one connected to pass reagent from the cylinder, said check valves including,
         a glass chamber having an inlet and an outlet, a ground glass flat valve seat in the chamber adjacent the inlet,
         a glass valve element positioned in said chamber and longitudinally movable toward and away from the seat, said element having a ground flat surface for seating on the seat, and
         a passageway in the chamber positioned adjacent the outlet and being of a length longer than the width of the valve element whereby the outlet will be opened even when the element is positioned adjacent the outlet.

2. The apparatus of claim 1 wherein the longitudinal axis of the ends of the outlet lines adjacent the reaction tubes are directed into the reaction tubes at an angle to the longitudinal axis of the tubes to intimately mix the reagent with the contents of the tubes.

3. The apparatus of claim 1 including,
   driving means loosely connected in a transverse direction to said piston by an engaging head and slot connection in which the slot is sufficiently wider in a transverse direction than said head whereby the alignment of the piston in the cylinder is unaffected by the driving means.

4. The apparatus of claim 1 wherein the check valves and cylinder are vertically positioned and both valves are connected to the cylinder at a position spaced from the piston when the piston is moved to the extent of its injection stroke.

5. In a chemical testing apparatus in which a plurality of reaction tubes are indexed through various positions, test samples and reagents are dispensed into the reaction tubes, and the contents of the tubes are heated and analyzed, the improvement in means for injecting the reagents into the tubes comprising,
   a plurality of chemical reagent containers,
   a plurality of outlet lines each connected to one of the containers and extending to a point above the top of the tubes, and
   reagent dispensing means in the outlet lines for drawing a predetermined amount of reagent from said containers and dispensing the reagent into a tube, said reagent dispensing means including,
      two one-way glass check valves connected to each outlet line, one connected to pass reagent from a container and one connected to pass reagent to a tube, said check valves including, a glass chamber having an inlet, a ground glass valve seat in the chamber about the inlet, a glass valve element positioned in the chamber and longitudinally movable toward and away from the seat, said element having a ground surface for seating on the seat, and means connected between the check valves for drawing reagent through one check valve and dispensing a measured amount of reagent through the second check valve.

6. The apparatus of claim 5 wherein the ground glass valve seat and the ground glass valve element include opposed coacting flat surfaces.

References Cited

UNITED STATES PATENTS

| | | | |
|---|---|---|---|
| 3,012,863 | 12/1961 | Feichtmeir | 23—259 X |
| 3,432,271 | 3/1969 | Wasilewski | 23—253 R |
| 3,476,518 | 11/1969 | Jungner | 23—253 X |
| 3,525,592 | 8/1970 | Buckley | 23—259 X |
| 3,533,744 | 10/1970 | Unger | 23—259 X |

MORRIS O. WOLK, Primary Examiner

R. E. SERWIN, Assistant Examiner

U.S. Cl. X.R.

23—259; 141—130